(12) United States Patent
Konishi

(10) Patent No.: US 11,511,421 B2
(45) Date of Patent: Nov. 29, 2022

(54) OBJECT RECOGNITION PROCESSING APPARATUS AND METHOD, AND OBJECT PICKING APPARATUS AND METHOD

(71) Applicant: OMRON Corporation, Kyoto (JP)

(72) Inventor: Yoshinori Konishi, Kyoto (JP)

(73) Assignee: OMRON Corporation, Kyoto (JP)

( * ) Notice: Subject to any disclaimer, the term of this patent is extended or adjusted under 35 U.S.C. 154(b) by 922 days.

(21) Appl. No.: 16/362,085

(22) Filed: Mar. 22, 2019

(65) Prior Publication Data

US 2019/0308320 A1 Oct. 10, 2019

(30) Foreign Application Priority Data

Apr. 5, 2018 (JP) .............................. JP2018-072896

(51) Int. Cl.
  *G06T 7/50* (2017.01)
  *B25J 9/16* (2006.01)
  (Continued)

(52) U.S. Cl.
  CPC ........... *B25J 9/1664* (2013.01); *B25J 9/1697* (2013.01); *G06K 9/6215* (2013.01); *G06T 7/50* (2017.01);
  (Continued)

(58) Field of Classification Search
  CPC ... G06T 7/50; G06T 2207/30164; G06T 7/75; G06T 7/60
  See application file for complete search history.

(56) References Cited

U.S. PATENT DOCUMENTS

| | | |
|---|---|---|
| 9,862,091 B2 | 1/2018 | Watanabe |
| 2011/0206237 A1 | 8/2011 | Saruta et al. |

(Continued)

FOREIGN PATENT DOCUMENTS

| | | |
|---|---|---|
| JP | 2009-129189 A | 6/2009 |
| JP | 6198104 B2 | 9/2017 |
| WO | 2012/011608 A1 | 1/2012 |

OTHER PUBLICATIONS

Akizuki et al., "Position and Pose Recognition of Randomly Stacked Objects using Highly Observable 3D Vector Pairs", IECON 2014—40th Annual Conference of the IEEE Industrial Electronics Society, Oct. 29, 2014, pp. 5266-5271, IEEE; Relevance is indicated in the extended European search report dated Jul. 29, 2019.

(Continued)

*Primary Examiner* — Sam Bhattacharya

(74) *Attorney, Agent, or Firm* — Metrolex IP Law Group PLLC

(57) ABSTRACT

An object recognition processing apparatus includes: a model data acquisition unit configured to acquire three-dimensional model data of an object; a measurement unit configured to acquire measurement data including three-dimensional position information of the object; a position/orientation recognition unit configured to recognize a position/orientation of the object based on the three-dimensional model data and the measurement data; a similarity score calculation unit configured to calculate a similarity score indicating a degree of similarity between the three-dimensional model data and the measurement data in a position/orientation recognition result of the object; a reliability calculation unit configured to calculate an index indicating a feature of a three-dimensional shape of the object, and calculate a reliability of the similarity score based on the index; and an integrated score calculation unit configured to (Continued)

calculate an integrated score indicating a quality of the position/orientation recognition result based on the similarity score and the reliability.

20 Claims, 11 Drawing Sheets

(51) Int. Cl.
- *G06T 7/73* (2017.01)
- *G06K 9/62* (2022.01)
- *G06T 7/60* (2017.01)
- *G06V 10/24* (2022.01)
- *G06V 10/20* (2022.01)
- *G06V 20/64* (2022.01)

(52) U.S. Cl.
CPC .................. *G06T 7/60* (2013.01); *G06T 7/75* (2017.01); *G06V 10/243* (2022.01); *G06V 10/255* (2022.01); *G06V 20/64* (2022.01); *G06V 20/647* (2022.01); *G06T 2207/30242* (2013.01); *G06V 2201/06* (2022.01)

(56) References Cited

U.S. PATENT DOCUMENTS

2016/0279791 A1 9/2016 Watanabe
2017/0173798 A1 6/2017 Watanabe et al.

OTHER PUBLICATIONS

Extended European search report dated Jul. 29, 2019 in a counterpart European patent application.
Office Action (JPOA) dated Apr. 23, 2021 in a counterpart Japanese patent application.

| WORKPIECE | POSITION /ORIENTATION RECOGNITION RESULT | S SIMILARITY SCORE | D1 INVERSE OF LARGEST NORMALIZED FREQUENCY IN FREQUENCY DISTRIBUTION OF NORMAL DIRECTIONS | D2 SURFACE AREA | R RELIABILITY | ST INTEGRATED SCORE |
|---|---|---|---|---|---|---|
| 51 | A | 100 | 1.00 | 1.0 | 1.00 | 100 |
| 52 | B | 100 | 1.33 | 1.0 | 1.33 | 133 |
| 53 | C | 100 | 1.33 | 0.6 | 0.80 | 80 |
| 54 | D | 100 | 1.67 | 1.0 | 1.67 | 167 |
| 55 | E | 70 | 1.00 | 1.0 | 1.00 | 70 |

FIG. 9

| WORKPIECE | POSITION /ORIENTATION RECOGNITION RESULT | S SIMILARITY SCORE | D1 INVERSE OF LARGEST NORMALIZED FREQUENCY IN FREQUENCY DISTRIBUTION OF NORMAL DIRECTIONS | D2 SURFACE AREA | R RELIABILITY | ST INTEGRATED SCORE |
|---|---|---|---|---|---|---|
| 56 | F | 80 | 1.00 | 1.0 | 1.00 | 80 |
| 57 | G | 100 | 1.00 | 0.4 | 0.40 | 40 |

FIG. 11

| WORKPIECE | POSITION /ORIENTATION RECOGNITION RESULT | S SIMILARITY SCORE | D1 INVERSE OF LARGEST NORMALIZED FREQUENCY IN FREQUENCY DISTRIBUTION OF NORMAL DIRECTIONS | D2 SURFACE AREA | R RELIABILITY | ST INTEGRATED SCORE |
|---|---|---|---|---|---|---|
| 56 | H | 100 | 1.67 | 1.0 | 1.67 | 167 |
| 57 | I | 100 | 1.67 | 1.0 | 1.67 | 167 |

OBJECT RECOGNITION PROCESSING APPARATUS AND METHOD, AND OBJECT PICKING APPARATUS AND METHOD

CROSS-REFERENCES TO RELATED APPLICATIONS

This application claims priority to Japanese Patent Application No. 2018-072896 filed Apr. 5, 2018, the entire contents of which are incorporated herein by reference.

FIELD

The disclosure relates to an object recognition processing apparatus and an object recognition processing method, and an object picking apparatus and an object picking method.

BACKGROUND

An apparatus (apparatus for picking objects that are piled up in bulk) is known for picking objects such as components (workpieces) that are piled up in bulk one by one using a robot, in an inspection and a production line to which FA (factory automation) is applied. In such an apparatus, for example, workpieces that are piled up in bulk are measured three-dimensionally, and the three-dimensional position/orientation of the individual workpieces are recognized by comparing (collating) the obtained measurement result with three-dimensional model data of workpieces. As a method of recognizing the three-dimensional position/orientation of such an object (object to be recognized), JP6198104B describes an apparatus and a method for evaluating the position/orientation of an object to be recognized by extracting contours (edges) and a surface shape of the object to be recognized from an image obtained using a three-dimensional measurement means, and comparing (collating) the contours and the surface shape with edges and surface shapes in three-dimensional model data, for example.

JP6198104B is an example of background art.

SUMMARY

Incidentally, in a known method of recognizing a position/orientation of an object, a degree of similarity (similarity score) in three-dimensional matching between three-dimensional model data and data obtained by measuring the object is normally used, for example, in order to determine the quality of the position/orientation recognition result. A "point group evaluation value" indicating the degree of recognition of a surface shape, which is described in JP6198104B, is one example of such a similarity score. For example, if the degree of similarity is higher than a predetermined threshold, the position/orientation recognition result is determined to be correct, and if the degree of similarity is lower than the predetermined threshold, the position/orientation recognition result is determined to be incorrect.

However, there is a problem in that, depending on the shape of an object to be recognized or the state in which the object is placed, even if a high similarity score was obtained in three-dimensional matching, the recognition is not actually successful, or the recognition accuracy is low although the object was recognized. Moreover, even if a recognition result with low accuracy, due to a similarity score whose reliability is actually low, has been obtained, it is difficult to determine whether or not the recognition result, which is evaluated using the similarity score, is correct.

Also, it is conceivable that a "contour evaluation value" indicating the degree of recognition of contours (edges), as described in JP6198104B, is used, in addition, in order to improve the accuracy in recognizing the position/orientation of an object. However, a luminance image, for example, that is used to recognize the contours of an object is easily affected by illumination and shadows when the image was captured. Therefore, even if the contour evaluation value is used, the recognition accuracy cannot be improved, depending on the situation in which the object was captured. Also, even if a recognition result whose accuracy is low, due to a contour evaluation value having low reliability, has been obtained, it is still difficult to determine whether or not the recognition result, which is evaluated using both of the similarity score and the contour evaluation value, is correct.

Also, there is a problem in that, if it is tried to pick an object based on a recognition result having a low accuracy in spite of the similarity score being high, the object cannot be gripped, and as a result, a stable favorable picking operation cannot be performed.

One or more aspects have been made in view of the above-described circumstances, and one or more aspects may provide an object recognition processing technique according to which a position/orientation recognition result whose accuracy is low, due to a similarity score having low reliability, can be discriminated, when the three-dimensional position/orientation of an object such as a workpiece is recognized, and as a result, a stable and favorable picking operation can be realized, and an object picking technique using the object recognition processing technique.

One or more aspects may employ the following configurations.

[1] An example of an object recognition processing apparatus according to the present disclosure includes: a model data acquisition unit configured to acquire three-dimensional model data indicating a three-dimensional shape of an object; a measurement unit configured to acquire measurement data including three-dimensional position information of the object; a position/orientation recognition unit configured to recognize a position/orientation of the object based on the three-dimensional model data and the measurement data; a similarity score calculation unit configured to calculate a similarity score indicating a degree of similarity between the three-dimensional model data and the measurement data in a position/orientation recognition result of the object; a reliability calculation unit configured to calculate an index indicating a feature of a three-dimensional shape of the object in the position/orientation recognition result of the object, and calculate a reliability of the similarity score based on the index; and an integrated score calculation unit configured to calculate an integrated score indicating a quality of the position/orientation recognition result of the object based on the similarity score and the reliability.

Note that one type of "index" or a plurality of types of "indices" may be used to calculate the "reliability" of the similarity score. If one type of "index" is used, the "index" itself may be the "reliability", or the "reliability" may be calculated by performing an appropriate correction on the "index". Also, if the "reliability" is calculated from a plurality of "indices", the operation for combining the plurality of "indices" is not specifically limited, and may be multiplication, division, or the like. Also, the "reliability" may be calculated by combining "indices" on which appropriate correction has been performed. Also, the operation for combining the "similarity score" and its "reliability" for calculating the "integrated score" is not specifically limited, and may be multiplication, division, or the like.

In this configuration, the position/orientation of an object is recognized by performing three-dimensional matching between the three-dimensional model data of the object to be recognized and the measurement data including three-dimensional position information of the object, for example, and the similarity score indicating the similarity therebetween in the position/orientation recognition result is calculated. Also, an index indicating a feature of the three-dimensional shape of the object in the position/orientation recognition result is calculated, and the reliability indicating the quality of the similarity score is calculated based on the calculated index. Also, an integrated score indicating the quality of the position/orientation recognition result is calculated by integrating the similarity score and the reliability. A position/orientation recognition result whose accuracy is low in spite of the similarity score being high can be discriminated by comparing the integrated score with a predetermined threshold, for example.

Accordingly, when an object is to be picked using a robot and a hand, an object whose integrated score is high in the position/orientation recognition result, that is, an object whose position/orientation recognition accuracy is high can be selected as the object to be gripped. Also, if a sufficiently high integrated score cannot be obtained, that is, if an object whose position/orientation recognition accuracy is sufficiently high cannot be selected, measurement data can be again acquired and the position/orientation can be again recognized after the measurement condition (image-capturing condition), the object detection condition in position recognition, or the like has been appropriately changed. As a result, a favorable and stable picking operation can be performed, compared with a case where picking is performed by determining the quality of the position/orientation recognition result of an object based only on the similarity score, for example.

As described above, according to this configuration, features of the three-dimensional shape of an object are focused on that cannot be grasped by the similarity score alone in the position/orientation recognition result of the object, and a reliability indicating the quality of the similarity score is calculated based on an index indicating the degree (richness) of those features of the three-dimensional shape. Also, the reliability is combined with the similarity score, and the result is digitized to obtain the integrated score, and as a result, the accuracy of discriminating the quality of the position/orientation recognition result can be improved.

[2] In the above-described configuration, the feature of the three-dimensional shape of the object may be a physical amount indicating diversity of the three-dimensional shape of the object that can be grasped from the position/orientation recognition result of the object, for example.

In this configuration, the physical amount indicating the diversity of the three-dimensional shape (in other words, richness of three-dimensional shape) of the object that has been reflected on the position/orientation recognition result can be calculated as the aforementioned index based on the position/orientation recognition result, and as a result, the features of the three-dimensional shape of an object can be digitized and easily evaluated.

[3] In the above-described configuration, the reliability calculation unit may calculate the number of faces in the position/orientation recognition result of the object as the index.

In this configuration, because the diversity or richness of the three-dimensional shape of an object, in the position/orientation recognition result, is reflected on the number of faces that can be detected in the position/orientation recognition result of the object, the calculation accuracy of the reliability of the similarity score and the integrated score can be improved by using the number of faces as the index.

[4] In the above-described configuration, the reliability calculation unit may quantize normal directions of faces in the position/orientation recognition result of the object, and calculate a largest normalized frequency or a dispersion in a frequency distribution of the quantized normal direction as the index. Note that the quantization method of the normal direction is not specifically limited, and a method may be illustrated in which a finite region on a plane orthogonal to the optical axis (axis passing through the view point) of the measurement unit is divided into a plurality of segments, appropriate numbers are given to the respective segments (numbering), and the number of the segment to which each normal vector belongs when the normal vectors of the faces are two-dimensionally projected on the finite region on the plane is associated with the direction (that is, normal direction) of the normal vector.

In this configuration, the largest normalized frequency (the inverse thereof is substantially equivalent thereto) or the dispersion in the frequency distribution of quantized normal directions with respect to respective faces detected in the position/orientation recognition result of an object represents the distribution of the faces detected in the position/orientation recognition result. Therefore, because the diversity or richness of the three-dimensional shape of the object in the position/orientation recognition result is reflected on the largest normalized frequency or dispersion in the frequency distribution of the quantized normal directions, the calculation accuracy of the reliability of the similarity score and the integrated score can be improved by using the largest normalized frequency or dispersion as the index.

[5] In the above-described configuration, the reliability calculation unit may calculate a surface area in the position/orientation recognition result of the object as the index.

In this configuration, because the diversity or richness of the three-dimensional shape of an object in the position/orientation recognition result is reflected on the surface area of the object that is calculated in the position/orientation recognition result of the object, the calculation accuracy of the reliability of the similarity score and the integrated score can be improved by using the surface area as the index.

[6] In the above-described configuration, the reliability calculation unit may calculate the number of contour lines (line segments corresponding to edges) or a length of contour lines (total length of line segments) in the position/orientation recognition result of the object as the index.

In this configuration, because the diversity or richness of the three-dimensional shape of an object in the position/orientation recognition result is reflected on the number of or a length of contour lines in the position/orientation recognition result of the object, the calculation accuracy of the reliability of the similarity score and the integrated score can be improved by using the number of or length of contour lines as the index.

[7] In the above-described configuration, the reliability calculation unit may calculate, as the index, the dispersion in a luminance distribution in the position/orientation recognition result of the object or the dispersion in a distance distribution in the position/orientation recognition result of the object.

In this configuration, because the diversity or richness of the three-dimensional shape of an object in the position/orientation recognition result is reflected on the dispersion in a luminance distribution calculated in the position/orientation recognition result of the object or a value representing a distance distribution calculated in the position/orientation recognition result of the object, the calculation accuracy of the reliability of the similarity score and the integrated score can be improved by using the dispersion as the index.

[8] In the above-described configuration, the reliability calculation unit may apply weighting to the index, and calculate the reliability of the similarity score based on the weighted index.

In this configuration, as a result of performing correction in which appropriate weighting is performed on an index, the reliability of the similarity score can be calculated considering the importance of the index, and therefore the calculation accuracy of the reliability of the similarity score and the integrated score can further be improved.

[9] In the above-described configuration, the reliability calculation unit may first calculate the index or the reliability for each of a plurality of different positions/orientations of the object, and then select the index or the reliability corresponding to the position/orientation recognition result of the object.

In this configuration as well, an index indicating the feature of a three-dimensional shape of an object corresponding to the position/orientation recognition result of the object, or the reliability of the similarity score can be selected, and the integrated score can be calculated based on them, and therefore the position/orientation recognition result whose accuracy is low in spite of the similarity score being high can be discriminated.

[10] An example of an object recognition processing method according to the present disclosure is a method that can be effectively implemented using an example of the object recognition processing apparatus according to the present disclosure that includes a model data acquisition unit, a measurement unit, a position/orientation recognition unit, a similarity score calculation unit, a reliability calculation unit, and an integrated score calculation unit, and includes the following steps. That is, the method includes: a step of the model data acquisition unit acquiring three-dimensional model data indicating a three-dimensional shape of an object; a step of the measurement unit acquiring measurement data including three-dimensional position information of the object; a step of the position/orientation recognition unit recognizing a position/orientation of the object based on the three-dimensional model data and the measurement data; a step of the similarity score calculation unit calculating a similarity score indicating a degree of similarity between the three-dimensional model data and the measurement data in a position/orientation recognition result of the object; a step of the reliability calculation unit calculating an index indicating a feature of a three-dimensional shape of the object in the position/orientation recognition result of the object, and calculating a reliability of the similarity score based on the index; and a step of the integrated score calculation unit calculating an integrated score indicating a quality of the position/orientation recognition result of the object based on the similarity score and the reliability.

[11] An example of an object picking apparatus according to the present disclosure is an apparatus for gripping and taking out an object, and includes: the example of the object recognition processing apparatus according to the present disclosure; a hand configured to grip the object; a robot configured to move the hand; and a control apparatus configured to control the object recognition processing apparatus, the hand, and the robot. Also the control apparatus includes:

an object-to-be-gripped determination unit configured to determine the object to be gripped by the hand based on the integrated score calculated by the object recognition processing apparatus; a gripping orientation calculation unit configured to calculate a gripping orientation of the hand when gripping the object; and a path calculation unit configured to calculate a path on which the robot moves the hand to the gripping orientation. Note that the measurement unit may be fixed, or may be installed such that the measurement unit can move, and in the latter case, the measurement unit itself may include a drive mechanism, or the measurement unit may be attached to a robot, for example.

In this configuration, an object to be gripped in picking is determined based on the integrated score calculated by the object recognition processing apparatus according to the present disclosure. For example, an object whose integrated score in the position/orientation recognition result is high (that is, position/orientation recognition accuracy is high) is selected as the object to be gripped. Therefore, a favorable and stable picking operation can be realized compared with a method in which picking is performed by determining the quality of the position/orientation recognition result of an object based only on the similarity score, for example.

[12] In the above-described configuration, a configuration may be adopted in which the control apparatus includes a measurement condition change unit configured to change a measurement condition when acquiring the measurement data based on the integrated score calculated by the object recognition processing apparatus, the measurement unit of the object recognition processing apparatus again acquires measurement data including three-dimensional position information of the object based on the changed measurement condition, and the position/orientation recognition unit of the object recognition processing apparatus again recognizes the position/orientation of the object based on the three-dimensional model data and the re-acquired measurement data.

Note that, here, if the measurement condition cannot be changed to an optimized measurement condition, that is, if the measurement unit physically interferes with the object or objects around the object, for example, the measurement condition may be changed to the next optimum measurement condition with which such interference will not occur.

In this configuration, if a position/orientation recognition result whose integrated score is sufficiently high (that is, the recognition accuracy is sufficiently high) has not been obtained based on the integrated score calculated by the object recognition processing apparatus according to the present disclosure, for example, the measurement condition is changed, and then, the measurement data including three-dimensional position information of the object is re-acquired, and the position/orientation of the object is re-recognized. Accordingly, the object to be gripped in picking can be determined after having obtained a position/orientation recognition result having a sufficiently high integrated score. Therefore, further favorable and stable picking operation can be realized compared with a method in which the quality of a position recognition result of an object is determined based only on the similarity score, and picking is performed without re-acquiring the measurement data and re-recognizing the position/orientation, for example.

[13] In the above-described configuration, the measurement condition change unit may change the position/orientation of the measurement unit as the measurement condition.

In this configuration, the view point of the measurement unit with respect to an object can be changed by changing the position/orientation of the measurement unit when re-acquiring the measurement data including three-dimensional position information of the object. As a result, the field of view when measuring an object can be variously changed without changing the placement state of the object, and therefore the recognition accuracy of the position/orientation can be further improved by selecting the position/orientation of the object at which the diversity of features of the three-dimensional shape increases.

[14] In the above-described configuration, the measurement condition change unit may calculate a position/orientation of the measurement unit to which the position/orientation of the measurement unit is to be changed based on the three-dimensional model data, a position/orientation recognition result of the object before re-recognition, and a position/orientation of the measurement unit before re-acquisition of the measurement data.

In this configuration, because the position/orientation recognition result of the object before re-recognition, and the position/orientation of the measurement unit before re-acquisition of the measurement data are known, the position/orientation recognition result of the object when the measurement data is acquired again by variously changing the position/orientation of the measurement unit can be estimated by using three-dimensional model data of the object. Also, as a result of calculating the reliability of the similarity score and the integrated score that have been described above with respect to the obtained estimated recognition results of various positions/orientations of the object, the quality of each of the estimated recognition result can also be estimated. Therefore, an optimum or favorable position/orientation is selected from the estimated recognition results of the positions/orientations of the object, and the position/orientation of the measurement unit at which the measurement data of the object in that state can be acquired can be set as the target measurement condition to which the measurement condition is to be changed.

[15] An example of an object picking method according to the present disclosure is a method that can be effectively implemented using an example of the object picking apparatus according to the present disclosure, and includes the following steps. That is, the method is a method for gripping and taking out an object using the object picking apparatus including the object recognition processing apparatus according to the present disclosure, a hand, a robot, and a control apparatus, and includes: a calculation step of the object recognition processing apparatus calculating an integrated score indicating a quality of a position/orientation recognition result of the object; a gripping step of the hand gripping the object; a moving step of the robot moving the hand; and a control step of the control apparatus controlling the object recognition processing apparatus, the hand, and the robot. The control step includes an object-to-be-gripped determination step of determining the object to be gripped by the hand based on the integrated score, a gripping orientation calculation step of calculating a gripping orientation of the hand when gripping the object, and a path calculation step of calculating a path on which the hand is moved to the gripping orientation by the robot.

Note that, in this specification, "unit" and "apparatus" do not simply mean a physical means but also include a configuration in which functions of the "unit" and "apparatus" are realized by software. Also, functions of one "unit" or one "apparatus" may also be realized by two or more physical means or apparatuses, or functions of two or more "units" or two or more "apparatuses" may also be realized by one physical means or apparatus. Furthermore, "unit" and "apparatus" are concepts that can be rephrased as "means" and "system", for example.

According to one or more aspects, when recognizing the three-dimensional position/orientation of an object such as a workpiece, a recognition result whose accuracy is low due to a similarity score having a low reliability can be discriminated, and accordingly, a favorable and stable picking operation can be realized.

BRIEF DESCRIPTION OF THE DRAWINGS

FIG. 9 is a diagram illustrating a table illustrating a list of calculation results of a similarity score, an index, reliability, and an integrated score in a recognition result of the position/orientation of objects, such as in FIG. 8B.

FIG. 11 is a diagram illustrating a table illustrating a list of calculation results of a similarity score, an index, reliability, and an integrated score in a recognition result of the position/orientation of objects, such as in FIG. 10B.

DETAILED DESCRIPTION

Figure 1:
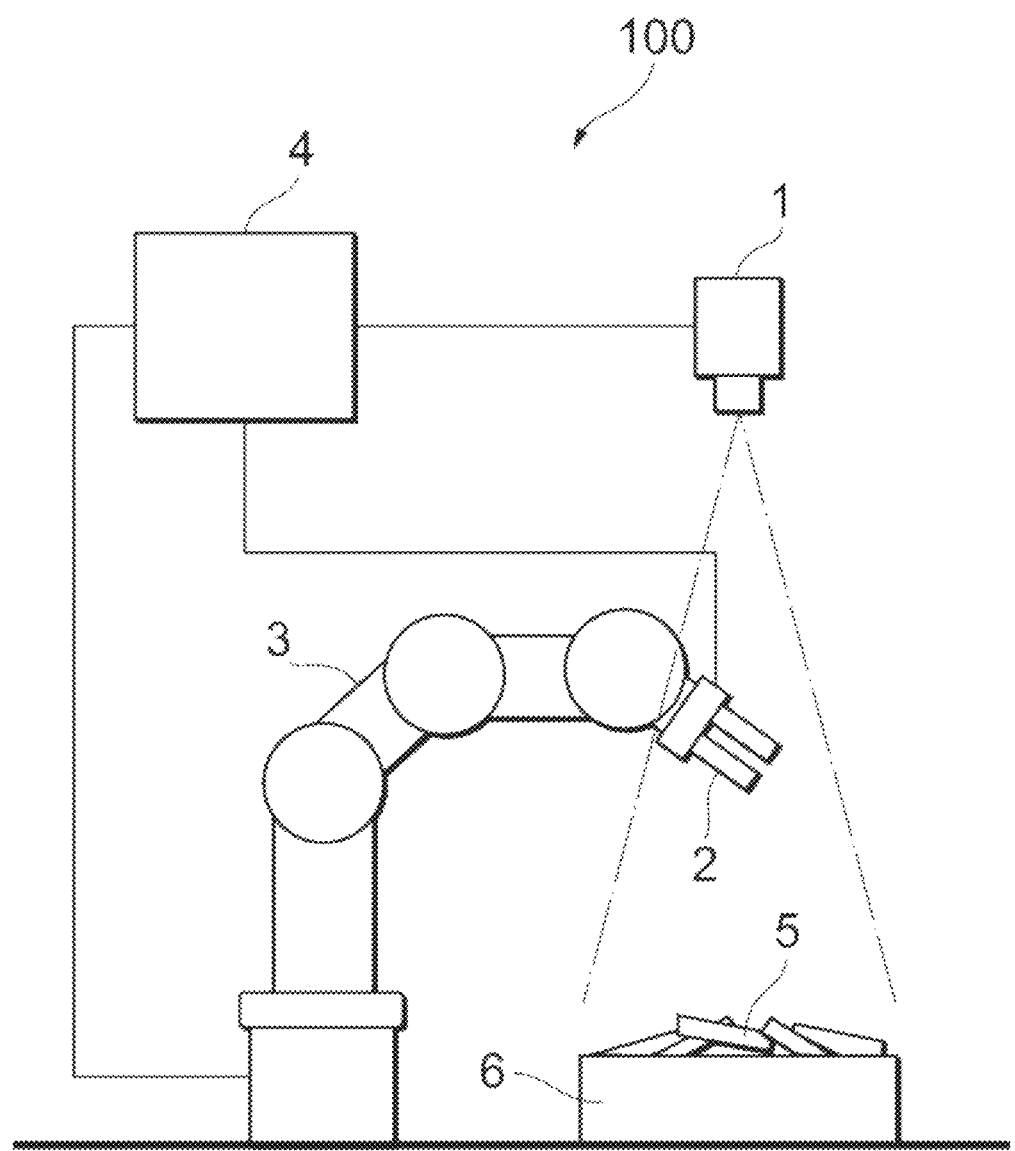
FIG. 1 is a plan diagram schematically illustrating an example of a situation to which an object picking apparatus including an object recognition processing apparatus according to one or more embodiments is applied.

The following describes embodiments according to an example of the present disclosure (hereinafter, may also be referred to as "embodiment") with reference to the drawings. Note that embodiments described below are merely illustrative, and is not intended to exclude any modifications and technical applications that are not explicitly described below. In other words, the example of the present disclosure can be carried out with various modifications without departing from the spirit of the disclosure. Also, in the drawings referenced below, identical or similar elements are denoted by identical or similar reference signs. The drawings are schematic, and the illustrations therein do not necessarily coincide with the actual dimensions, ratios, and the like. Also, the dimensional relationships and ratios of portions may differ between drawings.

1. Application Example

First, a situation to which an example of the present disclosure is applied will be described using FIG. 1. FIG. 1 is a plan view schematically illustrating an example of the situation to which a workpiece picking apparatus 100 including an object recognition processing apparatus according to one or more embodiments is applied. The workpiece picking apparatus 100 according to one or more embodiments takes out a plurality of workpieces 5 that are piled up in bulk inside a supply apparatus, such as a storage container 6 from the storage container 6, moves the workpieces 5 to an appropriate tray (not shown) or the like, and aligns and arranges them, for example. Also, in the example of FIG. 1, the workpiece picking apparatus 100 includes a sensor 1, a hand 2, a robot 3, and a control apparatus 4.

The sensor 1 corresponds to an example of a "measurement unit" in the "object recognition processing apparatus" according to one or more embodiments, and the hand 2, the robot 3, and the control apparatus 4 correspond to respective examples of a "hand", a "robot", and a "control apparatus" in an "object picking apparatus" according to one or more embodiments. Also, the workpiece 5 corresponds to an example of an "object" to be recognized by the "object recognition processing apparatus" according to one or more embodiments, and also corresponds to an example of an "object" to be picked by the "object picking apparatus" according to one or more embodiments. Moreover, the workpiece picking apparatus 100 corresponds to an example of the "object picking apparatus" according to one or more embodiments.

The sensor 1 is a range sensor that acquires measurement data including three-dimensional position information of a workpiece 5, includes a camera in which a general optical sensor is mounted, for example, and captures an image of the workpiece 5 at a predetermined viewing angle and a predetermined measurement condition.

Here, the measurement method of the workpiece 5 is not specifically limited, and a method is appropriately selected and used from various types of active measurement methods that utilize the property of light to propagate straight (a spatially coded pattern projection method, a temporally coded pattern projection method, a moire topography method, and the like that use triangulation as the basic principle), various types of passive measurement methods that utilize the property of light to propagate straight (a stereo camera method, a visual hull method, a factorization method, and the like that use triangulation as the basic principle, a depth from focusing method and the like that use coaxial distance measurement as the basic principle), and various types of active measurement methods that utilize the speed of light (a time of flight (TOF) measurement method, a laser scan method, and the like that use synchronous distance measurement as the basic principle), for example.

Image data (such as three-dimensional point group data or a range image) that can be acquired using the various types of measurement methods, and appropriate data with which three-dimensional model data of the workpiece 5 can be compared (collated) are examples of data obtained by measuring the workpiece 5. Also, three-dimensional coordinates data, two-dimensional coordinates data that is obtained by two-dimensionally projecting the three-dimensional coordinates data in correspondence to various different positions/orientations of the workpiece 5, data corresponding to an appropriate template and pattern, and the like are examples of the three-dimensional model data of the workpiece 5.

Also, the sensor 1 may include, as necessary, a projector (not shown) that projects illumination light for 3D including appropriate measurement light (such as pattern light and scanning light that are used in the active method), or illumination light for 2D, which is a normal illumination, to the workpiece 5. The configuration of the projector is not specifically limited, and in the case of projecting pattern light, a configuration may be adopted in which a laser source, a pattern mask, and a lens are included, for example. Light that has emitted from a laser source is transformed to measurement light (pattern light) having a predetermined pattern by a pattern mask in which the predetermined pattern has been formed, and is projected on a workpiece 5 via a lens.

The hand 2 includes a gripping mechanism for gripping and disengaging individual workpieces 5. The robot 3 is provided with the hand 2 at a leading edge of its arm, and includes a drive mechanism for moving the hand 2 to a position (gripping position) at which a workpiece 5 in the storage container 6 is to be gripped, and also moving the hand 2 that has gripped the workpiece 5 from the gripping position to the above-mentioned tray or the like. The control apparatus 4 is connected to the sensor 1, the hand 2, and the robot 3, and controls processing relating to various operations and computations needed in the workpiece picking apparatus 100, in addition to processing for measuring a workpiece 5 by the sensor 1, processing for gripping a workpiece 5 by the hand 2, and processing for driving the robot 3. Specifically, the control apparatus 4 performs processing shown in the following (1) to (10), in addition to controlling the sensor 1.

(1) Model Data Acquisition Processing

Three-dimensional model data (three-dimensional CAD model data) that represents the three-dimensional shape of a workpiece 5 that has been created prior to position/orientation recognition of the workpiece 5 is acquired. Also, an appropriate template or model pattern that can be used in later-described position/orientation recognition processing is created using the three-dimensional model data, as necessary.

(2) Position/Orientation Recognition Processing

Three-dimensional matching is performed in which the three-dimensional model data that has been acquired or created in the processing (1) is compared (collated) with measurement data of the sensor 1 using a predetermined recognition parameter, and the position/orientation (three-dimensional coordinates and a rotation angle about a three-dimensional axis of a workpiece 5, for example) of a workpiece 5 is recognized. Also, for example, an image may be output in which contour lines (line segments corresponding to edges) or the like that have been detected as feature points or feature parts of each workpiece 5 in three-dimensional matching are distinguishably displayed on a two-dimensional image that has been obtained by two-dimensionally projecting the position/orientation of the workpiece 5 that has been recognized, as a position/orientation recognition result of the workpiece 5.

(3) Similarity Score Calculation Processing

A similarity score, which indicates a degree of matching in the three-dimensional matching that has been performed when the position/orientation of a workpiece 5 has been recognized, is calculated using a predetermined calculation parameter, as the degree of similarity between the three-dimensional model data and the measurement data in the position/orientation recognition result of the workpiece 5 obtained in the processing (2).

(4) Reliability Calculation Processing

An index is calculated that indicates a feature, in the three-dimensional shape, of a workpiece 5 in the position/orientation recognition result of the workpiece 5 obtained in the processing (2). Here, a later-described feature amount, that is, a physical amount that indicates the diversity of the three-dimensional shape of the workpiece 5 that has been obtained from the position/orientation recognition result is an example of the "index" that indicates the feature, in three-dimensional shape, of the workpiece 5. Note that the "index" is not limited thereto. Also, instead of the value of each of the following indices itself, the "index" may be a result obtained by performing an appropriate correction computation on the value.

Index 1: The number of faces (discriminable planar regions that are demarcated by contour lines as illustrated above) that can be detected in the position/orientation recognition result of a workpiece 5. It is preferable that their number is large.

Index 2: The largest normalized frequency or its inverse of a frequency distribution of quantized normal directions with respect to respective faces that can be detected in the position/orientation recognition result of a workpiece 5. It is preferable that the largest normalized frequency is small (that its inverse is large).

Index 3: The dispersion of a frequency distribution of quantized normal directions (excluding those whose frequency is zero) with respect to respective faces that can be detected in the position/orientation recognition result of a workpiece 5. It is preferable that the dispersion is small.

Index 4: The surface area of a workpiece 5 that can be calculated in the position/orientation recognition result of the workpiece 5. It is preferable that the surface area is large.

Index 5: The number of contour lines (line segments corresponding to edges) that can be detected in the position/orientation recognition result of a workpiece 5. It is preferable that their number is large.

Index 6: The length of the contour lines (line segments corresponding to edges) that can be detected in the position/orientation recognition result of a workpiece 5. It is preferable that the length is large.

Index 7: The dispersion of a luminance distribution in the position/orientation recognition result of a workpiece 5. It is preferable that the dispersion is large.

Index 8: The dispersion of a distance distribution in the position/orientation recognition result of a workpiece 5. It is preferable that the dispersion is large.

Also, the reliability of the similarity score obtained in the processing (3) is calculated using these indices indicating the features, in the three-dimensional shape, of a workpiece 5. Specifically, if any of the above indices is used, the single index itself, or the value obtained by performing an appropriate correction (such as weighting) on the single index can be used as the reliability of the similarity score, for example. Also, if two or more of the above indices are used, the reliability of the similarity score can be calculated by combining the two or more indices or values obtained by performing appropriate correction on the respective indices, by performing an appropriate computation, for example.

(5) Integrated Score Calculation Processing

An integrated score is calculated that indicates the quality of the position/orientation recognition result of a workpiece 5 obtained in the processing (2) by combining the similarity score obtained in the processing (3) and the reliability obtained in the processing (4) by performing an appropriate computation, for example.

(6) Object-to-be-Gripped Determination Processing

The integrated score, that has been obtained in the processing (5), of the position/orientation recognition result of each detected workpiece 5 is compared with a predetermined threshold (determination value), and workpieces 5 of a position/orientation recognition result whose integrated score is at least the threshold value are determined to be the workpieces 5 to be gripped by the hand 2, for example.

(7) Measurement Condition Change Processing

The integrated score, that has been obtained in the processing (5), of the position/orientation recognition result of each detected workpiece 5 is compared with the predetermined threshold (determination value), and if no position/orientation recognition result with an integrated score of at least the threshold value has been obtained, then the measurement condition is changed, for example.

(8) Gripping Orientation Calculation Processing

With respect to a workpiece 5 that has been determined to be gripped in the processing (6), the gripping orientation of the hand 2 when the hand 2 grips the workpiece 5 is calculated using a predetermined calculation parameter based on the position/orientation recognition result of the workpiece 5 obtained in the processing (2).

(9) Path Calculation Processing

The path of the hand 2 when the robot 3 moves the hand 2 from an initial orientation to a gripping orientation is calculated using a predetermined calculation parameter, based on a calculation result of the gripping orientation of the hand 2 when gripping the workpiece 5 that has been obtained in the processing (8) and the initial orientation (initial position) of the hand 2.

(1) Various Kinds of Control Processing

The operation of the sensor 1 is controlled based on the measurement condition when measurement data including three-dimensional position information of a workpiece 5 is acquired, the operation of the hand 2 is controlled based on the calculated gripping orientation, and the operation of the robot 3 is controlled based on the calculated path.

As described above, the control apparatus 4 corresponds to examples of a "model data acquisition unit", a "position/orientation recognition unit", a "similarity score calculation unit", a "reliability calculation unit", and a "integrated score calculation unit" of the "object recognition processing apparatus" according to one or more embodiments, and in this regard, the sensor 1 and the control apparatus 4 correspond to an example of the "object recognition processing apparatus" according to one or more embodiments. Also, the control apparatus 4 also corresponds to examples of an "object-to-be-gripped determination unit", a "measurement condition change unit", a "gripping orientation calculation unit", and a "path calculation unit" in the "object picking apparatus" according to one or more embodiments.

As described above, according to the workpiece picking apparatus 100 including the object recognition processing apparatus of one or more embodiments, the problem of the known object recognition processing method that the quality of a position/orientation recognition result of a workpiece 5 is difficult to be determined, and as a result, a case may occur in which the workpiece 5 is failed to be gripped is resolved, and a stable favorable picking operation can be realized.

That is, in the known object recognition processing method, a situation may arise in which, in spite of a fact that a high similarity score has been obtained as a result of three-dimensional matching in position/orientation recognition, recognition was actually not successful, or the recognition accuracy was low. Also, if it is tried to pick a workpiece 5 without understanding such a situation, the object may not be picked successfully. In contrast, according to the workpiece picking apparatus 100 including the object recognition processing apparatus of one or more embodiments, not only the similarity score in three-dimensional matching, but also the reliability of the similarity score and the integrated score are calculated using an index focusing on diversity of the three-dimensional shape in the position/orientation recognition result of a workpiece 5. Also, the quality of the position/orientation recognition result of the workpiece 5 can be determined based on the integrated score. Accordingly, a workpiece 5 whose recognition accuracy is high is preferentially selected to be gripped, or, if the position/orientation recognition result having sufficiently high accuracy cannot be obtained, the position/orientation of the workpiece 5 can be again recognized after the measurement condition has been changed. As a result, the success rate of gripping and picking objects can be substantially improved, and a favorable and stable picking operation can be realized.

2. Exemplary Configuration

Hardware Configuration

Figure 2:
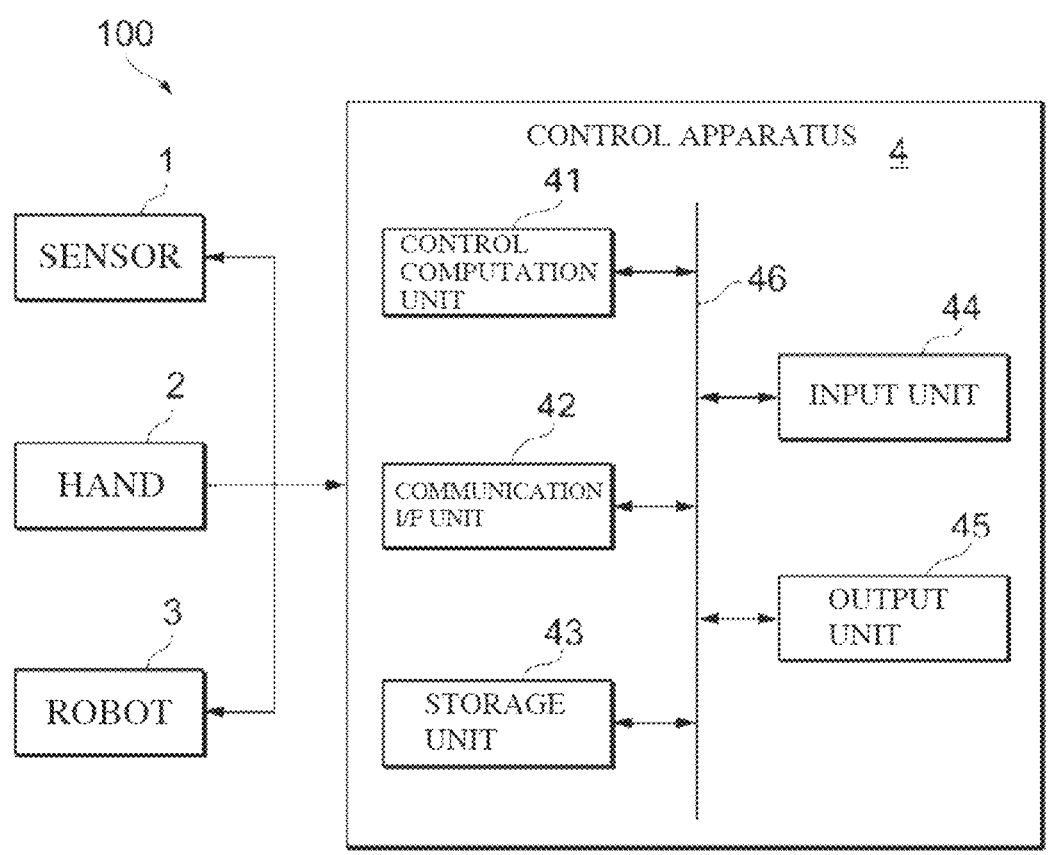
FIG. 2 is a plan diagram schematically illustrating an example of a hardware configuration of an object picking apparatus including an object recognition processing apparatus according to one or more embodiments.

Next, an example of the hardware configuration of the workpiece picking apparatus 100 including the object recognition processing apparatus according to one or more embodiments will be described using FIG. 2. FIG. 2 is a plan view schematically illustrating an example of the hardware configuration of the workpiece picking apparatus 100 including the object recognition processing apparatus according to one or more embodiments.

In the example in FIG. 2 as well, the workpiece picking apparatus 100 includes the sensor 1, the hand 2, the robot 3, and the control apparatus 4 that are illustrated in FIG. 1. Here, the control apparatus 4 includes a control computation unit 41, a communication interface (I/F) unit 42, a storage unit 43, an input unit 44, and an output unit 45, and the units may be connected to communicate with each other via a bus line 46.

The control computation unit 41 includes a CPU (central processing unit), a RAM (random access memory), a ROM (read only memory), and controls the constituent elements and performs various types of computations according to information processing.

The communication I/F unit 42 is a communication module for communicating with a "unit", which is another constituent element, and an "apparatus" by wired or wireless communication. The communication I/F unit 42 can adopt any communication method for communication such as a LAN (local area network) and a USB (universal serial bus), and an appropriate communication line that is equivalent to the bus line 46 may also be applied. The control computation unit 41 and the like can communicate with the sensor 1, the hand 2, and the robot 3 via the communication I/F unit 42.

The storage unit 43 is an auxiliary storage apparatus such as a hard disk drive (HDD) or a solid state drive (SSD), and stores various types of programs (computation programs for executing various processing illustrated in the processing (1) to (9) described above, control programs for performing processing for controlling operations of the sensor 1, the hand 2, and the robot 3 illustrated in the processing (10) described above, and the like) that are executed by the control computation unit 41, measurement data output from the sensor 1, a data base including a measurement condition, a recognition parameter, and various calculation parameters, data of various computation results and calculation results, data relating to a position/orientation recognition result of a workpiece 5, data relating to a situation and a record of picking a workpiece 5, three-dimensional model data of a workpiece 5, and the like. As a result of the computation programs and the control programs that are stored in the storage unit 43 being executed by the control computation unit 41, various processing functions in a later-described exemplary functional configuration are realized.

The input unit 44 is an interface device for accepting various input operations from a user that uses the workpiece picking apparatus 100, and may be realized by a mouse, a keyboard, a touch panel, a microphone, and the like. The output unit 45 is an interface device for notifying the user that uses the workpiece picking apparatus 100 of various information through display, sound output, print output, or the like, and may be realized by a display, a speaker, a printer, and the like.

Functional Configuration

Figure 3:
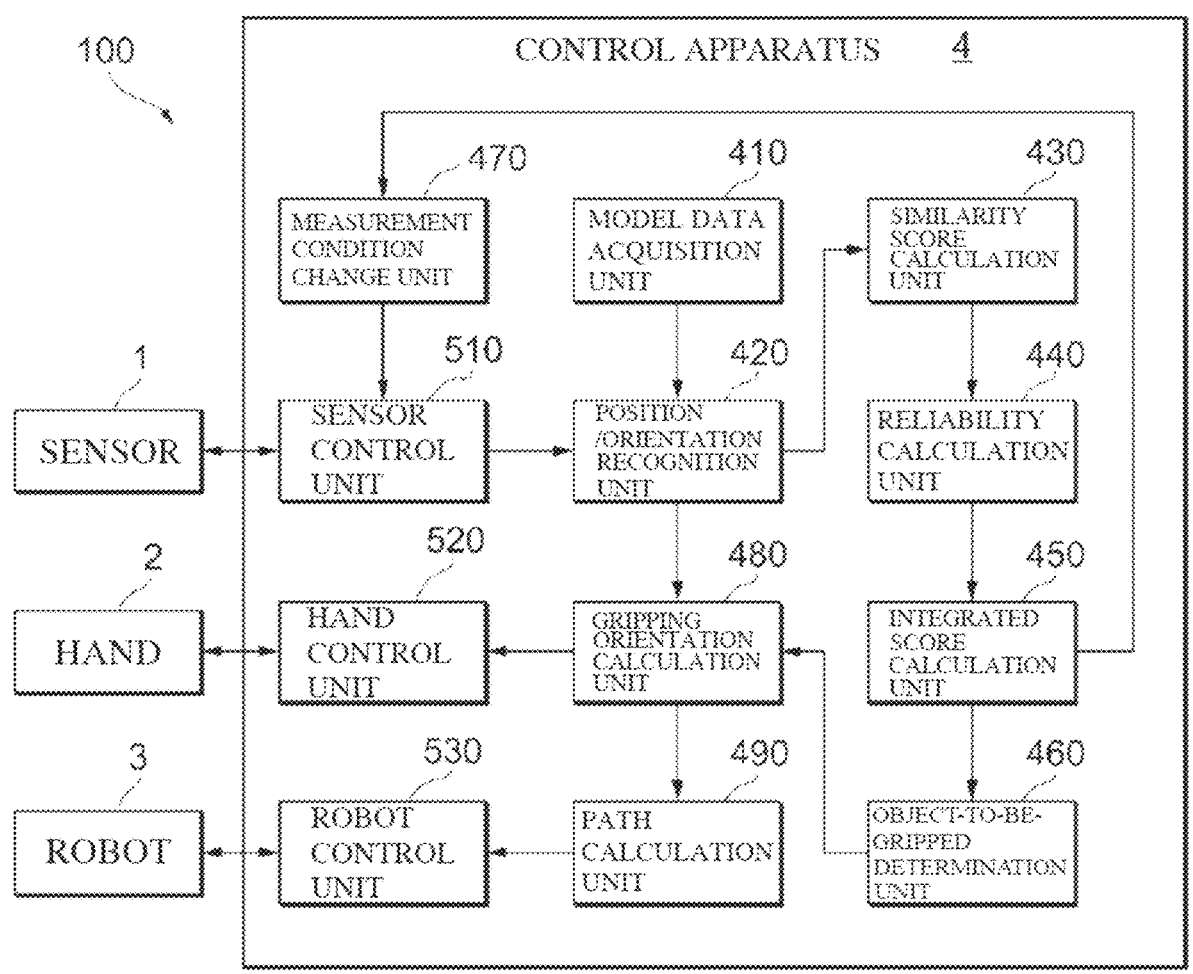
FIG. 3 is a plan diagram schematically illustrating an example of a functional configuration of an object picking apparatus including an object recognition processing apparatus according to one or more embodiments.

Next, an example of a functional configuration of the workpiece picking apparatus 100 including the object recognition processing apparatus according to one or more embodiments will be described using FIG. 3. FIG. 3 is a plan view schematically illustrating an example of the functional configuration of the workpiece picking apparatus 100 including the object recognition processing apparatus according to one or more embodiments.

The control computation unit 41 of the workpiece picking apparatus 100 shown in FIG. 2 deploys various types of programs (control programs, computation programs, and the like) stored in the storage unit 43 to a RAM. Also, the control computation unit 41 controls the constituent elements by interpreting and executing, using a CPU, various types of programs that are deployed in the RAM. With this, as illustrated in FIG. 3, the workpiece picking apparatus 100 according to one or more embodiments may realize a configuration including the control apparatus 4 that includes a model data acquisition unit 410, a position/orientation recognition unit 420, a similarity score calculation unit 430, a reliability calculation unit 440, an integrated score calculation unit 450, an object-to-be-gripped determination unit 460, a measurement condition change unit 470, a gripping orientation calculation unit 480, and path calculation unit 490 that execute processing illustrate in the processing (1) to (9) described above, and a sensor control unit 510, a hand control unit 520, and a robot control unit 530 that execute the control processing illustrated in the processing (10) described above.

Note that, in one or more embodiments, an example has been described in which functions that are realized by the control apparatus 4 included in the workpiece picking apparatus 100 are realized by a general purpose CPU, but some or all of the functions may be realized by one or a plurality of dedicated processors. Also, in the functional configuration of the control apparatus 4 included in the workpiece picking apparatus 100, the functions may be omitted, replaced, or added as appropriate according to embodiments and exemplary configurations. Also, the "control apparatus" can be understood as a general information processing apparatus (such as a computer and a work station).

3. Exemplary Operations

Figure 4:
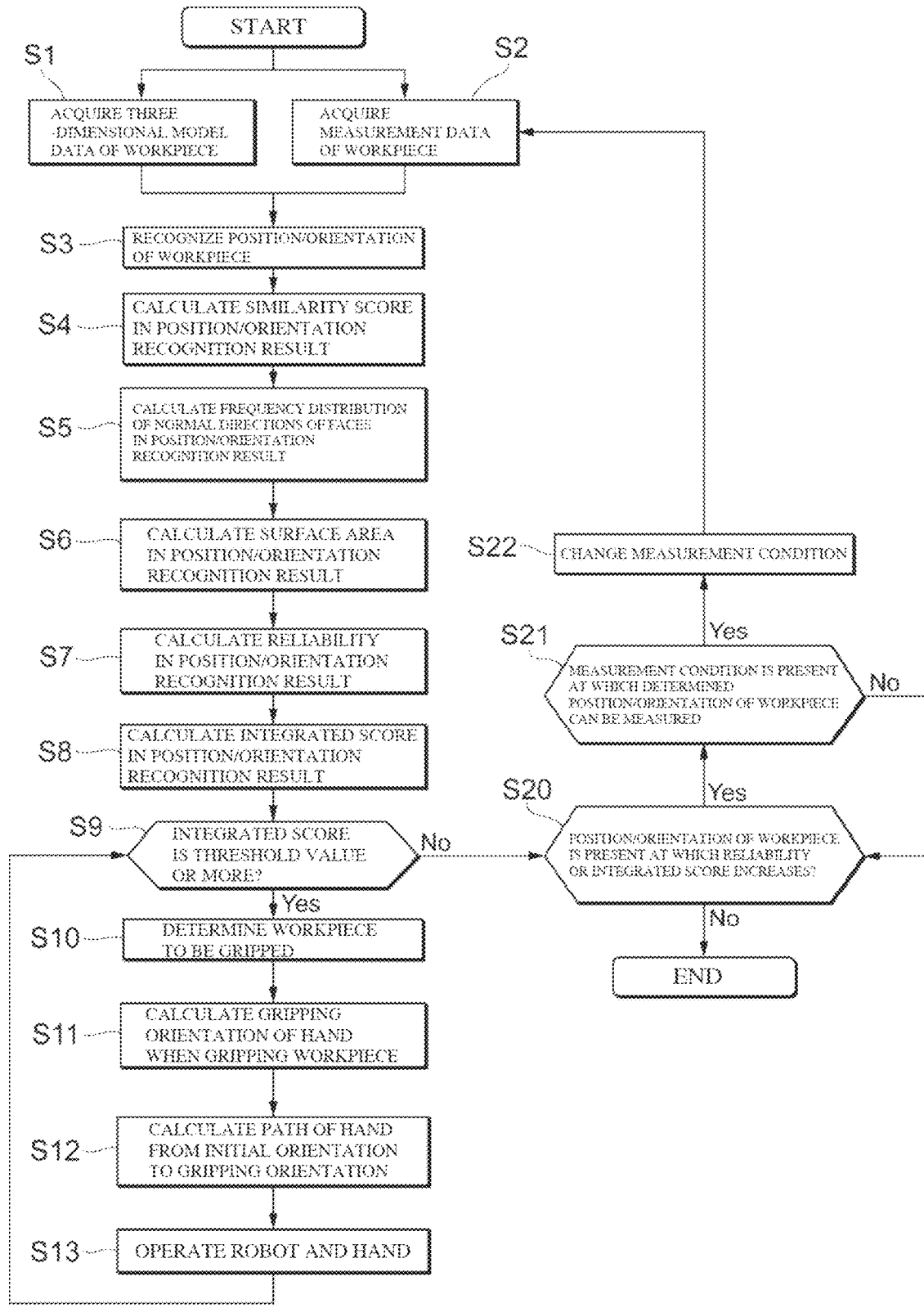
FIG. 4 is a flow diagram illustrating an example of a processing procedure of an object picking apparatus including an object recognition processing apparatus according to one or more embodiments.

Next, an example of operations of the workpiece picking apparatus 100 will be described using FIG. 4. FIG. 4 is a flowchart illustrating an example of the processing procedure in the workpiece picking apparatus 100 including the object recognition processing apparatus according to one or more embodiments, and is also a flowchart illustrating an example of an object recognition processing method using the object recognition processing apparatus and an example of the processing procedure in a workpiece picking method using the workpiece picking apparatus 100. Note that the processing procedure described below is merely an example, and each processing may be modified to the extent possible in a range of technical concept of the present disclosure. Also, in the processing procedure described below, the steps can be omitted, replaced, or added as appropriate according to embodiments and exemplary configurations.

Activation

First, a user of the workpiece picking apparatus 100 activates the workpiece picking apparatus 100, and causes various types of programs (such as computation programs and control programs) to be executed. Then, the control computation unit 41 in the control apparatus 4 controls operations of the sensor 1, the hand 2, and the robot 3 according to the processing procedure described below, and each functional unit in the control apparatus 4 performs computation processing. Also, in one or more embodiments, at a timing before the timing at which the processing is performed in the steps described below, a set of initial values of a measurement condition, a recognition parameter, and various calculation parameters that are needed in the step is read out from the storage unit 43, and the parameters are stored in the sensor control unit 510, the position/orientation recognition unit 420, the gripping orientation calculation unit 480, and the path calculation unit 490 as appropriate. Note that the measurement condition and the various parameters can also be read out at an appropriate timing as long as the timing is before the timing at which the processing is performed in the respective steps.

Step S1

In step S1, the model data acquisition unit 410 acquires three-dimensional model data (three-dimensional CAD model data) representing the three-dimensional shape of a workpiece 5 that has been created in advance, and a template and a model pattern that can be used in three-dimensional matching, and stores them in the storage unit 43. Thus, step S1 corresponds to "(1) model data acquisition processing" in the above-described application example.

Step S2

In step S2, the sensor control unit 510 causes the sensor 1 to operate, measures a workpiece 5 using the set of initial values of the measurement condition, and acquires measurement data including three-dimensional position information of the workpiece 5. The measurement condition includes various conditions to be set in the measurement method to be applied, in addition to an exposure time, a lighting illuminance, and a measurement position (relative three-dimensional position or an orientation (direction of optical axis) of the sensor 1 relative to the workpiece 5, for example). Also, the sensor 1 outputs, to the control apparatus 4, a luminance image or the like, as necessary, in addition to three-dimensional point group data (point cloud data), or range image or the like, as the measurement data of the workpiece 5. Thus, step S2 corresponds to "(10) various kinds of control processing" in the above-described application example.

Step S3

In step S3, the position/orientation recognition unit 420 extracts feature points indicating the three-dimensional shape of a workpiece 5 from the measurement data of the workpiece 5, performs three-dimensional matching in which the extracted feature points are compared (collated) with corresponding feature points or a feature pattern in the three-dimensional model data of the workpiece 5, in a predetermined search region, and recognizes the position/orientation of individual workpieces 5 using the set of initial values of the recognition parameter of the position/orientation of the workpiece 5. Output data of the position/orientation that has been recognized includes three-dimensional coordinates (x, y, z) and a rotation angle (rx, ry, rz) about a three-dimensional axis of the workpiece 5, for example. Also, the position/orientation recognition unit 420 calculates the number of workpieces 5 with respect to which the position/orientation has been detected, as necessary, and stores the recognition result and the calculation result to the storage unit 43. The recognition parameter of the position/orientation of a workpiece 5 includes a threshold value relating to the detection of the workpiece 5 in position/orientation recognition, for example, and specifically, a threshold value or the like for three-dimensional matching between the three-dimensional model data of the workpiece 5 and the measurement data of the workpiece 5 is illustrated. Furthermore, the position/orientation recognition unit 420 outputs an image shown in FIG. 5, for example, and its image rendering data, as the position/orientation recognition result of each detected workpiece 5, and stores them to the storage unit 43.

Figures 5, 6:
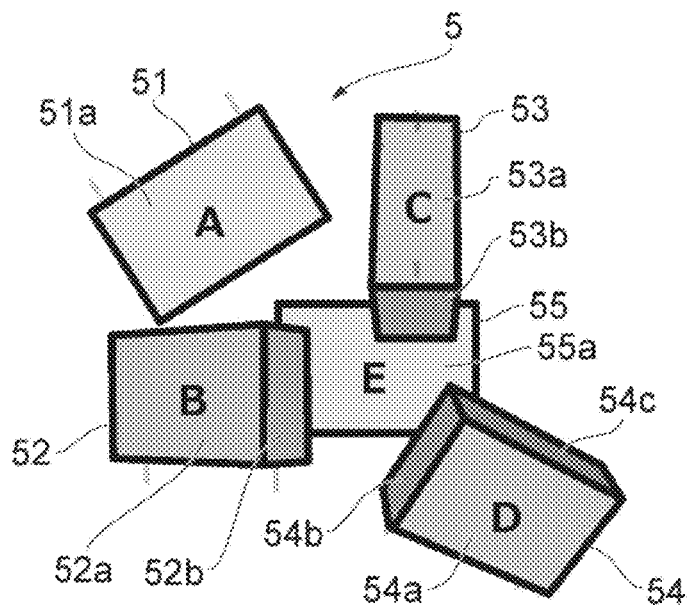
FIG. 5 is a plan diagram schematically illustrating an example of a recognition result of the position/orientation of objects obtained by an object recognition processing apparatus included in an object picking apparatus according to one or more embodiments.
FIG. 6 is a diagram illustrating a table illustrating a list of calculation results of a similarity score, an index, reliability, and an integrated score in a recognition result of the position/orientation of objects, such as in FIG. 5.

Here, FIG. 5 is a plan view schematically illustrating an example of position/orientation recognition results of workpieces 51 to 55 (each correspond to a workpiece 5, and their three-dimensional shapes are the same, in this example) that have been recognized by the object recognition processing apparatus included in the workpiece picking apparatus 100 according to one or more embodiments. As shown in FIG. 5, the position/orientation recognition result output here is an image in which contour lines (line segments, which are indicated by thick solid lines in FIG. 5, corresponding to edges), for example, that are detected as feature points and feature parts of the workpieces 51 to 55 in three-dimensional matching are distinguishably displayed on a two-dimensional image obtained by two-dimensionally projecting positions/orientations of the workpieces 51 to 55 that have been recognized. Note that the position/orientation recognition results of the respective workpieces 51 to 55 in this example are denoted by letters A to E, for the sake of convenience, and in FIG. 5, letters A to E indicating the position/orientation recognition results are added to the display regions of the corresponding workpieces 51 to 55. Thus, step S3 corresponds to "(2) position/orientation recognition processing" in the above-mentioned application example.

Step S4

In step S4, the similarity score calculation unit 430 calculates similarity scores S, which indicate the degree of matching in the three-dimensional matching performed in step S3, using a set of initial values of predetermined calculation parameters, as the degree of similarity between the three-dimensional model data and the measurement data in the position/orientation recognition results A to E of the workpieces 51 to 55. Here, the similarity score of S is represented by a value in a range from 0 to 100, for example, a similarity score of S=0 corresponds to the lowest degree of matching, and a similarity score of S=100 corresponds to the highest degree of matching.

That is, of the workpieces 51 to 55 displayed in FIG. 5, the workpieces 51 to 54 are in a state in which no other workpiece is overlapped on the front side of these workpieces, and the entirety of position/orientation can be visually recognized. Therefore, in the workpieces 51 to 54, peripheral edges of the overall shapes and contours (edges) corresponding to the boundaries between faces are all recognized, and the contour lines (thick solid lines) indicating the recognition result matches the actual contours of the workpieces 51 to 54. As a result, the similarity scores S of the respective position/orientation recognition results A to D of the workpieces 51 to 54 shown in FIG. 5 are all high, and are calculated as "100", for example.

On the other hand, of the workpieces 51 to 55 displayed in FIG. 5, the other workpieces 52 to 54 overlap the front side of the workpiece 55, and only a portion of the position/orientation of the workpiece 55 is recognizable. Therefore, of the contours corresponding to the peripheral edges of its shape, only those contours (edges) of the workpiece 55, that are not hidden by the other workpieces 52 to 54 are recognized, and only the contour lines (thick solid lines) of this recognition result match the actual contours of the visible portions of the workpiece 55. As a result, the similarity score S in the position/orientation recognition result E of the workpiece 55 shown in FIG. 5 is smaller than the similarity scores S of the other workpieces 51 to 54, and is calculated as "70", for example.

An example of the calculation results of the similarity scores S in the position/orientation recognition results A to E of the workpieces 51 to 55 that have been obtained in this way is listed in the table in FIG. 6. Thus, step S4 corresponds to "(3) similarity score calculation processing" in the above-described application example.

Step S5

In step S5, the reliability calculation unit 440 calculates an index D1 indicating a feature of the three-dimensional shape in the position/orientation recognition results A to E of the workpieces 51 to 55 shown in FIG. 5. Here, first, the reliability calculation unit 440 specifies faces that can be detected in each of the position/orientation recognition results A to E of the workpieces 51 to 55. Next, the reliability calculation unit 440 obtains a normal vector (indicating a normal direction) of each of the specified faces, and quantizes the normal vector. Then, the reliability calculation unit 440 calculates, with respect to each of the position/orientation recognition results A to E of the workpieces 51 to 55, the largest normalized frequency in the frequency distribution of the quantized normal directions. Also, the reliability calculation unit 440 calculates an inverse of the obtained largest normalized frequency (value obtained by operating an inverse operator on the largest normalized frequency) as the ultimate index D1. Thus, the index D1 calculated in this step corresponds to an index 2 (a largest normalized frequency in the frequency distribution of quantized normal directions of faces that are detected in the position/orientation recognition result of each workpiece 5, or an inverse of that largest normalized frequency) in the above-described application example.

Specifically, as shown in FIG. 5, the number of faces (discriminable planar regions that are demarcated by contour lines in the recognition result) that have been specified in the position/orientation recognition results A to E of the workpieces 51 to 55 are respectively one face (51a), two faces (52a, 52b), two faces (53a, 53b), three faces (54a, 54b, 54c), and one face (55a). Also, normal vectors corresponding to the directions of the respective faces are calculated using any known method based on the three-dimensional point group data that has been output from the sensor 1. Moreover, the normal direction of each face is quantized based on the obtained normal vector using a known or predetermined method (for example, a normal direction quantization method described in Japanese Application No. 2017-182517 is a preferable example, and in particular, FIG. 4 and its description in Japanese Application No. 2017-182517 should be referred to).

Figure 7A:
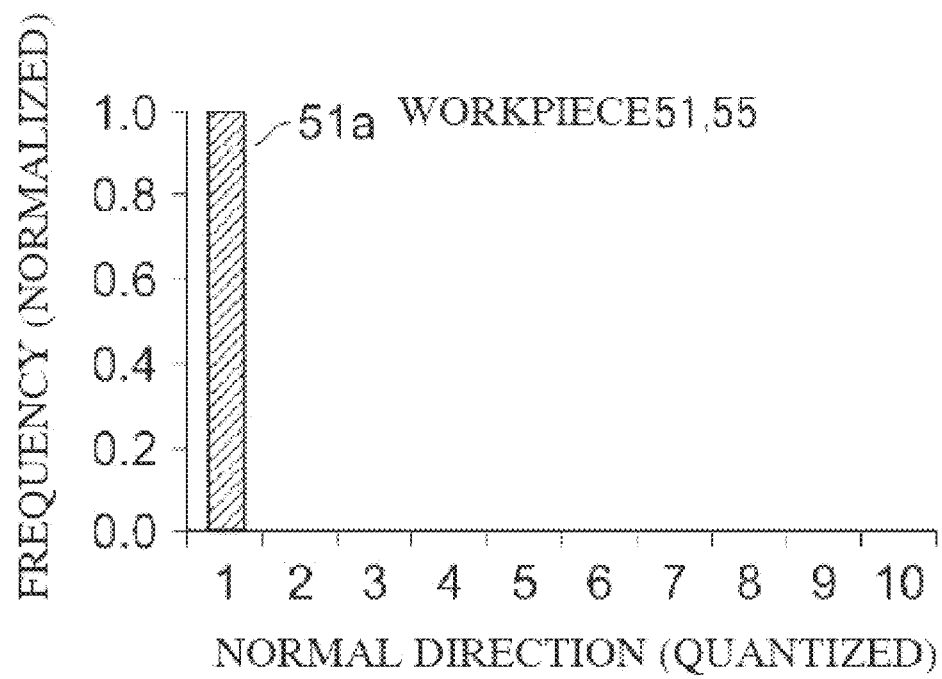
FIG. 7A is a diagram illustrating a graph schematically illustrating a frequency distribution of normal directions of faces specified in a recognition result of the position/orientation of objects, such as in FIG. 5.

An example of frequency distributions of quantized normal directions obtained with respect to the workpieces 51 to 55 shown in FIG. 5 is shown in FIGS. 7A to 7D. FIG. 7A (graph (A)) shows a frequency distribution of quantized normal directions of the workpieces 51 and 55, and FIGS. 7B to 7D (graphs (B) to (D)) show frequency distributions of quantized normal directions of the workpieces 52 to 54, respectively. Note that FIGS. 7A to 7D show results when the normal vector is quantized in 10 directions, and the horizontal axis shows quantization numbers corresponding to respective quantized normal directions, and the vertical axis shows the frequency in each of the normal directions. Here, the frequencies of the normal directions are normalized such that the total of the frequencies for each workpiece is "1", that is, normalized values are shown.

Figure 7B:
FIG. 7B is a diagram illustrating a graph schematically illustrating a frequency distribution of normal directions of faces specified in a recognition result of the position/orientation of objects, such as in FIG. 5.

Specifically, as shown in FIG. 7A, the position/orientation recognition results A and E of the workpieces 51 and 55 each show a frequency distribution that includes one normal direction (corresponding to face 51a or 55a) whose quantized direction is "1" and whose normalized frequency is "1.0". Also, as shown in FIG. 7B, the position/orientation recognition result B of the workpiece 52 shows a frequency distribution that includes a normal direction (corresponding to face 52a) whose quantized direction is "2" and whose normalized frequency is "0.75", and a normal direction (corresponding to face 52b) whose quantized direction is "8" and whose normalized frequency is "0.25".

Figure 7C:
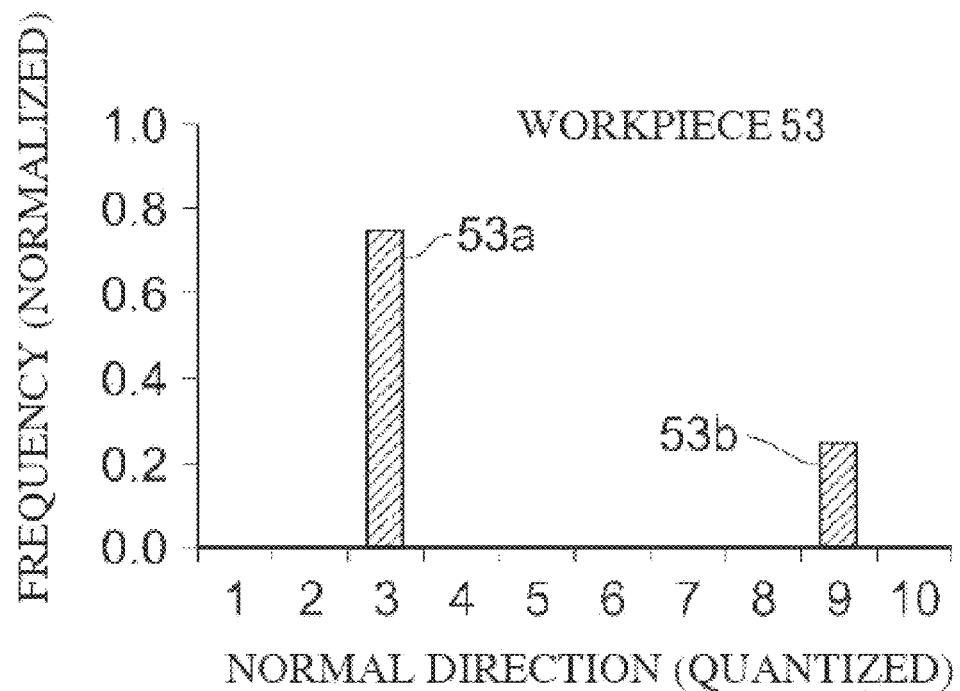
FIG. 7C is a diagram illustrating a graph schematically illustrating a frequency distribution of normal directions of faces specified in a recognition result of the position/orientation of objects, such as in FIG. 5.
Figure 7D:
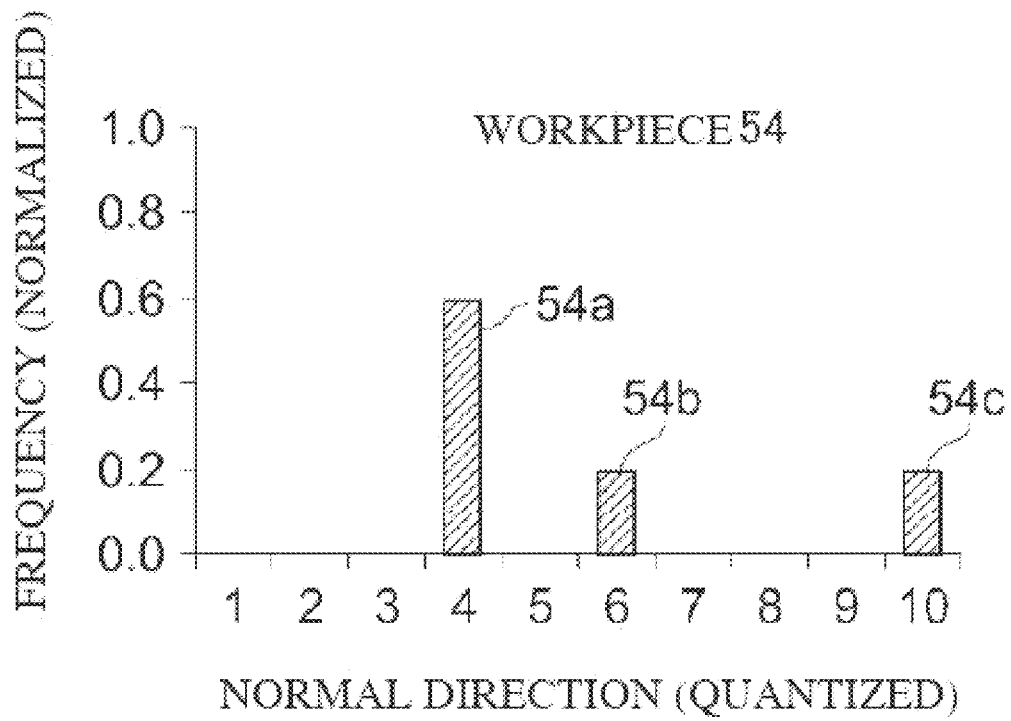
FIG. 7D is a diagram illustrating a graph schematically illustrating a frequency distribution of normal directions of faces specified in a recognition result of the position/orientation of objects, such as in FIG. 5.

Meanwhile, as shown in FIG. 7C, the position/orientation recognition result C of the workpiece 53 shows a frequency distribution that includes a normal direction (corresponding to face 53a) whose quantized direction is "3" and whose normalized frequency is "0.75", and a normal direction (corresponding to face 53b) whose quantized direction is "9" and whose normalized frequency is "0.25". Also, as shown in FIG. 7D, the position/orientation recognition result E of the workpiece 54 shows a frequency distribution that includes a normal direction (corresponding to face 54*a*) whose quantized direction is "4" and whose normalized frequency is "0.6", a normal direction (corresponding to face 54*b*) whose quantized direction is "6" and whose normalized frequency is "0.2", and a normal direction (corresponding to face 54*c*) whose quantized direction is "10" and whose normalized frequency is "0.2".

In the frequency distributions of the quantized normal directions shown in FIGS. 7A to 7D, the largest normalized frequencies of the normal direction in the position/orientation recognition results A to E of the workpieces 51 to 55 are respectively "1.0" (face 51*a*), "0.75" (face 52*a*), "0.75" (face 53*a*), "0.60" (face 54*a*), and "1.0" (face 55*a*). Also, as a result of obtaining inverses of these values, the indices D1 in the position/orientation recognition results A to E of the workpieces 51 to 55 are respectively calculated as "1.0" (face 51*a*), "1.33" (face 52*a*), "1.33" (face 53*a*), "1.67" (face 54*a*), and "1.0" (face 55*a*). An example of calculation results of the index D1 in the position/orientation recognition results A to E of the workpieces 51 to 55 obtained in this way is listed in the table of FIG. 6.

Step S6

In step S6, the reliability calculation unit 440 calculates the surface areas of the recognized workpieces 51 to 55, as indices D2 indicating features of the three-dimensional shapes in the position/orientation recognition results A to E of the workpieces 51 to 55 shown in FIG. 5. For example, the reliability calculation unit 440 specifies, in the three-dimensional point group data output from the sensor 1 or two-dimensional images corresponding thereto, two-dimensional coordinates of the contour lines that defines peripheral edges of planar regions (not actual shape regions of workpieces 51 to 55) in the position/orientation recognition results A to E of the workpieces 51 to 55 shown in FIG. 5, and calculates areas from the two-dimensional coordinates as the surface areas in the position/orientation recognition results A to E of the workpieces 51 to 55.

Alternatively, areas of respective faces that are specified, in step S5, with respect to each the workpieces 51 to 55 are calculated at the same time, and the sum of the areas for each of the workpieces 51 to 55 is used as the surface area in each of the position/orientation recognition results A to E. Moreover, the surface areas in the position/orientation recognition results A to E of the workpieces 51 to 55 may be obtained as absolute values, or may be obtained as relative values (that is, normalized values) using the surface area of a specific workpiece 5 as the reference. Thus, the index D2 calculated in this step corresponds to the index 4 (surface area of a workpiece 5 calculated in the position/orientation recognition result of the workpiece 5) in the above-described application example.

Specifically, the surface areas of the workpieces 51 to 55 shown in FIG. 5 are calculated, and then relative values when the surface area of the workpiece 51 is set as "1.0" are calculated, and as a result, the indices D2 in the position/orientation recognition results A to E of the workpieces 51 to 55 are calculated as "1.0", "1.0", "0.6", "1.0", and "1.0", respectively. An example of calculation results of the index D2 in the position/orientation recognition results A to E of the workpieces 51 to 55 obtained in this way is listed in the table of FIG. 6.

Step S7

In step S7, the reliability calculation unit 440 calculates a reliability R of the similarity score in each of the position/orientation recognition results A to E of the workpieces 51 to 55 using obtained indices D1 and D2. Here, one of the indices D1 and D2 may be taken as the reliability R as is, or the reliability R may be obtained by performing an appropriate correction on the index D1 or D2 such as weighting according to the importance or priority of the index D1 or D2, for example. Also, the reliability R may be obtained by combining the indices D1 and D2 or indices obtained by performing an appropriate correction such as weighting on the indices D1 and D2 by performing an appropriate computation such as multiplication.

Specifically, if reliability R=index D1×index D2, the reliabilities R of the similarity scores S in the position/orientation recognition results A to E of the workpieces 51 to 55 are calculated as "1.00", "1.33", "0.80", "1.67", and "1.00", respectively. An example of calculation results of the reliabilities R of the similarity scores in the position/orientation recognition results A to E of the workpieces 51 to 55 obtained in this way is listed in the table of FIG. 6. Thus, steps S5 to S7 correspond to "(4) reliability calculation processing" in the above-described application example.

Step S8

In step S8, the integrated score calculation unit 450 calculates an integrated score ST by combining the obtained similarity score S and reliability R by performing an appropriate computation such as a multiplication. Specifically, if integrated score ST=similarity score S×reliability R, the integrated scores ST in the position/orientation recognition results A to E of the workpieces 51 to 55 are calculated as "100", "133", "80", "167", and "100", respectively. An example of calculation results of the integrated scores ST of the similarity scores in the position/orientation recognition results A to E of the workpieces 51 to 55 obtained in this way is listed in the table of FIG. 6. Thus, step S8 corresponds to "(5) integrated score calculation processing" in the above-described application example.

Step S9

In step S9, which is branch processing, the object-to-be-gripped determination unit 460 determines whether or not the obtained integrated score ST is a preset threshold value (such as "90", "100", or "110") or more, for example. If the integrated score ST is the threshold value or more, the processing advances to step S10 onward, which will be described later, and if the integrated score ST is less than the threshold value, the processing advances to step S20 onward, which will be described later.

Step S10

In step S9, if the integrated score ST is determined to be the threshold value or more ("Yes" in step S9), in step S10, the object-to-be-gripped determination unit 460 selects the workpiece 5 relating to the position/orientation recognition result with respect to which the integrated score ST being the threshold value or more has been obtained. For example, workpieces 5 to be gripped by the hand 2 are determined in descending order, or in any order, of the integrated score ST. In particular, if the threshold value is "90", and the integrated scores ST shown in FIG. 6 have been obtained, the object-to-be-gripped determination unit 460 selects the workpieces 51, 52, and 54 whose integrated scores ST are "90" or more, and can determine that the workpieces 54, 52, and 51 are to be gripped in descending order of the integrated score ST (in this case, the workpiece 54 whose integrated score ST is "167", which is highest, is to be gripped first, for example). Thus, steps S9 and S10 correspond to "(6) object-to-be-gripped determination processing" in the above-described application example.

Step S11

In step S11, the gripping orientation calculation unit 480 calculates the gripping orientation of the hand 2 when gripping the workpiece 5 that has been determined to be gripped by the hand 2 based on the position/orientation of the workpiece 5 that has been recognized in step S3, using a set of initial values of parameters for calculating the gripping orientation of the hand 2 when gripping the workpiece 5. The parameters for calculating the gripping orientation of the hand 2 when gripping the workpiece 5 includes a threshold value that is used when calculating the gripping orientation. Note that, in this step, only the gripping orientation for gripping the workpiece 5 (workpiece 54, for example) that is to be gripped next may be calculated, or all of the gripping orientations for gripping the workpieces 5 (workpieces 51, 52, and 54, for example) that have been determined to be gripped in step S10 may be calculated. Thus, step S11 corresponds to "(8) gripping orientation calculation processing" in the above-described application example.

Step S12

In step S12, the path calculation unit 490 calculates a path on which the hand 2 is moved from its initial orientation to the gripping orientation calculated in step S11 using a set of initial values of parameters for calculating the path on which the hand 2 is moved from its initial orientation to the gripping orientation. The parameters for calculating the path on which the hand 2 is moved from its initial orientation to the gripping orientation includes a threshold value that is used when determining whether or not the hand 2 interferes with workpieces 5 and the storage container 6, for example. Thus, step S12 corresponds to "(9) path calculation processing" in the above-described application example.

Step S13

In step S13, the robot control unit 530 causes the robot 3 to function, and moves the hand 2 to the gripping orientation that has been calculated in step S11 with respect to the workpiece 5 to be gripped, based on the path to the workpiece 5 that has been calculated in step S12. Then, the hand control unit 520 causes the hand 2 to function and grip the workpiece 5 to be gripped based on the gripping orientation. Moreover, the robot control unit 530 and the hand control unit 520 perform control such that the gripped workpiece 5 is taken out from the storage container 6, and the workpiece 5 is moved to an appropriate tray or the like, and is arranged in an aligned state. Thus, step S13 also corresponds to "(10) various control processing" in the above-described application example.

After executing step S13, the processing returns to step S9, and if another workpiece 5 having a high integrated score ST that has been determined to be gripped is present, the processing in steps S10 to S13 is performed again.

Step S20

On the other hand, if the integrated score ST is determined to be less than the threshold value ("No" in step S9) in step S9, in step S20, which is a branching step, the measurement condition change unit 470 determines whether or not a position/orientation of the workpiece 5 is present at which the reliability R of the similarity score S or integrated score ST may increase relative to the reliability R or integrated score ST that has been once calculated in the previous step S7, for example.

For example, if the position/orientation recognition result of the workpiece 5 has been obtained in the previous step S3, and if the position/orientation of the sensor 1 (which can be acquired from the encoder data of a drive mechanism of the sensor 1, for example) has been determined in the previous step S2, the position/orientation recognition result of the workpiece 5 can be estimated when measurement is performed while variously changing the position/orientation of the sensor 1, using the three-dimensional model data of the workpiece 5 acquired in the previous step S1. Also, processing in steps S4 to S8 is executed on the obtained various estimated recognition results of the position/orientation of the workpiece 5, and estimated values of the reliability R of the similarity score S and the integrated score ST in the estimated recognition results are calculated. Also, the estimated values of the reliability R of the similarity score S and the integrated score ST that have been obtained in this way are compared with the values that have been already obtained, and it is determined whether or not a position/orientation of the workpiece 5 is present at which a higher reliability R or integrated score ST can be obtained. Here, if it has been determined that the position/orientation of the workpiece 5 is not present at which a higher reliability R or integrated score ST can be obtained ("No" in step S20), the processing is ended.

Step S21

On the other hand, if it has been determined in step S20 that the position/orientation of a workpiece 5 is present for which a higher reliability R or integrated score ST can be obtained ("Yes" in step S20), then, in step S21, which is a branching step, the measurement condition change unit 470 determines whether or not there is a measurement condition (position/orientation of the sensor 1, for example) with which the sensor 1 can measure an optimum position/orientation of the workpiece 5 for which the highest reliability R or integrated score ST is obtained, for example.

In general, the workpieces 5 are contained in the storage container 6 or the like, or are placed on a support base in a state of being piled up in bulk, and therefore, it is useful to change the measurement condition such as the position/orientation of the sensor 1, rather than moving the workpiece 5, in order to realize a target position/orientation of a workpiece 5. However, when the position/orientation of the sensor 1 is changed, for example, it is possible that the sensor 1 and the drive mechanism of the sensor 1 physically interferes with a workpiece 5 or an object in the vicinity thereof. When this happens, the sensor 1 cannot actually be moved to the target position/orientation, and the target position/orientation of the workpiece 5 cannot be measured using the sensor 1. Therefore, if it has been determined that the target position/orientation of the workpiece 5 cannot be measured by the sensor 1 ("No" in step S21), the processing returns to step S20, and the determination as to whether or not there is a next optimum position/orientation of the workpiece 5, and determination, in step S21, as to whether or not there is a measurement condition are repeatedly performed.

Here, the method and procedure for calculating the target position/orientation of the sensor 1 and its drive mechanism are not specifically limited, and the method and procedure may be as follows, for example. That is, first, the orientation transformation to be performed on the sensor 1 can be obtained by, if the distance between the sensor 1 and the workpiece 5 does not change, inverting, about x-y axis, the signs of an orientation transformation (matrix) of the workpiece 5 from the current position/orientation to the target position/orientation, for example. Moreover, the orientation transformation of the drive mechanism (robot 3, if the sensor 1 is attached to the robot 3) of the sensor 1 for moving the sensor 1 to the target position/orientation can be calculated by calibrating the correspondence relationship between the coordinate system of the sensor 1 and the coordinate system of the drive mechanism in advance.

Step S22

On the other hand, in step S21, if it has been determined that the target position/orientation of the workpiece 5 can be measured by the sensor 1 ("Yes" in step S21), in step S22, the measurement condition change unit 470 changes the set of initial values of conditions for measuring the workpiece 5 by the sensor 1 to a set including the position/orientation of the sensor 1 at which the target position/orientation of the workpiece 5 can be obtained.

After executing step S22, the processing returns to step S2, the sensor control unit 510 (and the robot control unit 530, if the sensor 1 is attached to the robot 3) changes the position/orientation of the sensor 1 based on the newly set measurement condition that has been changed, and again acquires the measurement data including three-dimensional position information of the workpiece 5 using the sensor 1 at this state, and the processing in step S3 onward is repeatedly executed.

4. Operation and Effect

As described above, according to an example of the workpiece picking apparatus 100 including the object recognition processing apparatus according to one or more embodiments, and the method using the apparatus, first, when the position/orientation of a workpiece 5 is recognized, the similarity score S in three-dimensional matching between the three-dimensional model data and the measurement data of the workpiece 5 is calculated. Also, not only the similarity score S, but also, as a result of focusing on a feature of the three-dimensional shape of the workpiece 5 in the position/orientation recognition result, the indices D1 and D2 that indicate the feature are calculated, and moreover, the reliability R of the similarity score S is calculated from the indices D1 and D2. Also, as a result of using the integrated score ST that can be obtained by combining the similarity score S and its reliability R, in addition to the similarity score S, the quality (recognition accuracy) of the position/orientation recognition result of the workpiece 5 can be determined.

For example, in the position/orientation recognition results A to E of the workpieces 51 to 55 shown in FIGS. 5 and 6, since the similarity scores S of the workpieces 51 to 54 all have the same high value ("100") in spite of the fact that the positions/orientations thereof are different from each other, as shown in FIG. 5, the difference in position/orientation between the workpieces 51 to 54 cannot be grasped only by the similarity score S.

In contrast, the reliabilities R of the similarity scores S that have been calculated, using the indices D1 and D2 according to one or more embodiments, with respect to the position/orientation recognition results A to D of the workpieces 51 to 54 having the same similarity score S have different values in a range from "0.80" to "1.67". As a result, the integrated scores ST calculated from the similarity scores S and reliabilities R have different values in a range from "80" to "167", and therefore, the difference in position/orientation between the workpieces 51 to 54, as shown in FIG. 5, can be sufficiently grasped, and the qualities and relative merits of the position/orientation recognition results A to E can be accurately determined.

Also, the workpieces 52 to 54 are overlapped on the front side of the workpiece 55, and the possibility of the workpiece 55 in this state being able to be gripped by the hand 2 is low, but the similarity score S of the workpiece 55 is "70", and although the similarity score S is lower than the similarity scores S of the workpieces 51 to 54, which are "100", the difference between "70" and "100" is not substantial. In contrast, although the integrated score ST in the position/orientation recognition result E of the workpiece 55 is the same as the similarity score S ("70"), the difference from the maximum integrated score ST ("167" in the position/orientation recognition result D of the workpiece 54) is rather large. Therefore, by appropriately setting the threshold value of the integrated score ST for determining the workpiece 5 to be gripped, the possibility of the workpiece 55 to be gripped can be more reliably determined.

Furthermore, according to the knowledge of the present inventor, in the case of the position/orientation of the workpiece 5 such as the position/orientation of the workpiece 51, as shown in FIG. 5, at which only one planar face is visible, the recognition accuracy in its planar direction (x-y direction), in particular, is likely to degrade (refer also to a later-described first modification). In contrast, in one or more embodiments, faces that are demarcated by the contour lines of the workpieces 51 to 55 in the position/orientation recognition results A to E are detected, the frequency distribution of the quantized normal directions is obtained with respect to the specified faces, and the inverse of the largest normalized frequency (see FIGS. 7A to 7D) in the frequency distribution of the normal directions obtained with respect to each of the workpieces 51 to 55 is calculated as the index D1. That is, the index D1 is a value obtained by digitizing the number of directions of the faces of a workpiece 5, and can be said as an index in which the diversity (richness) of the three-dimensional shape of the workpiece 5 is highly reflected thereon. That is, as shown in FIG. 5, the larger the number of faces, of each of the workpieces 51 to 55, that are visible is, the higher the diversity of the three-dimensional shape is, and the index D1 can be calculated accordingly, as shown in FIG. 6. Therefore, the calculation accuracy of the reliability R of the similarity score S and the integrated score ST can be improved by using the index D1, and as a result, the difference in position/orientation between the workpieces 51 to 55 can be accurately grasped, and the quality and relative merits of the position/orientation recognition results A to E can be accurately determined.

Furthermore, in one or more embodiments, surface areas of the workpieces 51 to 55 in the position/orientation recognition results A to E are calculated as the indices D2. Here, because the feature points in the workpieces 51 to 55 that have been compared (collated) in three-dimensional matching increase as the surface area increases, the position/orientation of a workpiece 5 whose surface area is large in the position/orientation recognition results A to E may include more information regarding the three-dimensional shape of the workpiece 5 than the position/orientation of a workpiece 5 whose surface area is small. Therefore, the index D2 also can be said as an index on which the diversity (richness) of the three-dimensional shape of the workpiece 5 is highly reflected. The indices D2 according to the surface areas of the workpieces 51 to 55 shown in FIG. 5 are calculated as shown in FIG. 6. Therefore, the calculation accuracy of the reliability R of the similarity score S and the integrated score ST can be improved by using the index D2, and as a result, the difference in position/orientation between the workpieces 51 to 55 can be more accurately grasped, and the quality and relative merits of the position/orientation recognition results A to E can be more accurately determined.

Also, in one or more embodiments, the integrated score ST of a workpiece 5 in the position/orientation recognition results A to E is compared with the predetermined threshold, and a workpiece 5 with a position/orientation recognition result having an the integrated score ST of at least the threshold value (that is, a workpiece 5 whose position/orientation is highly accurately recognized) is determined to be gripped by the hand 2, for example. Therefore, a favorable and stable picking operation can be realized, compared with a known method in which picking is performed by determining the quality of the position/orientation recognition result of a workpiece 5 based only on the similarity score S.

Also, in one or more embodiments, if a position/orientation recognition result of a workpiece 5 having an integrated score ST of at least the threshold value has not been obtained, the measurement data including three-dimensional position information of the workpiece 5 is again acquired after changing the measurement condition, and the position/orientation of the workpiece 5 is again recognized. Therefore, even if the position/orientation of a workpiece 5 that has been recognized is not accurate, and the workpiece 5 is not selected to be gripped, the recognition accuracy of the position/orientation can be improved. With this, the number of workpieces 5 that can be reliably gripped can be increased (that is, the gripping success rate is improved), and more favorable and stable picking operation can be realized.

Moreover, when this operation is performed, the measurement condition of the sensor 1 is changed after grasping the position/orientation of a workpiece 5 at which the reliability R of the similarity score S or the integrated score ST in the position/orientation recognition result of the workpiece 5 may be improved relative to that obtained before re-acquisition and re-recognition of the measurement data, and determining whether or not the position/orientation of the workpiece 5 can be realized. Therefore, the recognition accuracy of the position/orientation can further be improved, and the possibility of a workpiece 5 being gripped by the hand 2 can further be improved, and as a result, further favorable and stable picking operation can be realized.

5. Modifications

Although embodiments, as an example of the present disclosure, have been described above in detail, the above descriptions merely shows an example of the present disclosure in all aspects. Needless to say, various improvements and modifications may be made without departing from the scope of the present disclosure. For example, the following modifications are possible. Note that, in the following description, the same constituent elements as the constituent elements described in the above embodiments are assigned the same signs, and descriptions of the same points as the points described in the above embodiments are omitted as appropriate. The following modifications may be combined as appropriate.

5.1 First Modification

Figure 8A:
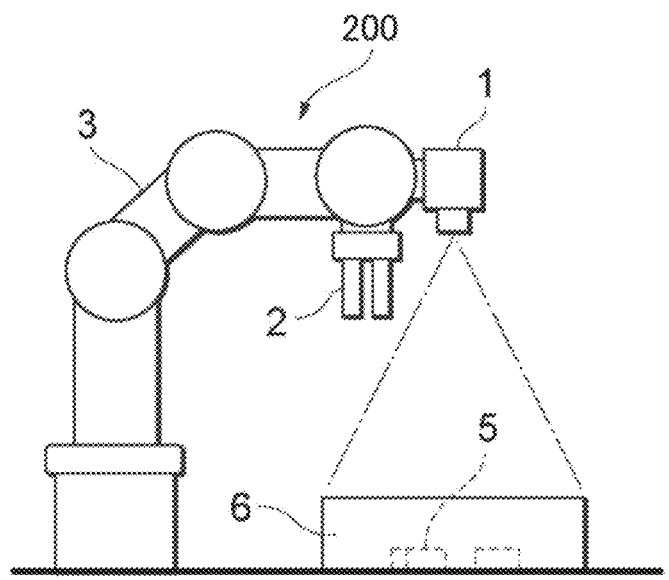
FIG. 8A is a plan diagram schematically illustrating an example of a situation to which an object picking apparatus including an object recognition processing apparatus according to a first modification is applied.
Figure 8B:
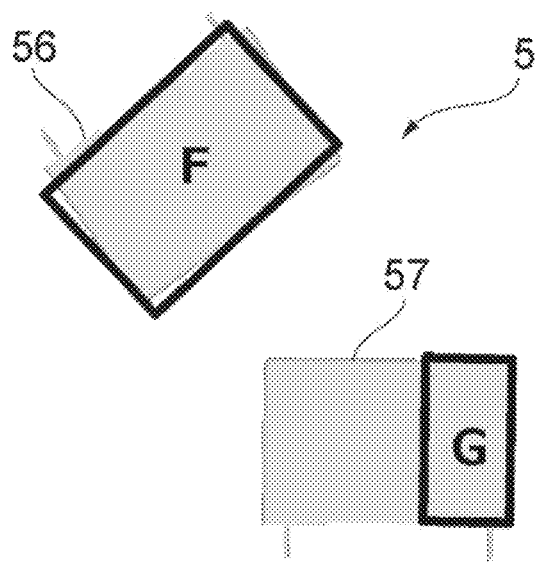
FIG. 8B is a plan diagram schematically illustrating an example of a recognition result of the position/orientation of objects obtained by an object recognition processing apparatus included in an object picking apparatus according to a first modification.

FIG. 8A is a plan view schematically illustrating an example of a situation to which a workpiece picking apparatus 200 including an object recognition processing apparatus according to a first modification. FIG. 8B is a plan view schematically illustrating an example of a recognition result of the position/orientation of workpieces 56 and 57 (each correspond to the workpiece 5, and their three-dimensional shapes are the same) obtained by the object recognition processing apparatus included in the workpiece picking apparatus 200 according to the first modification.

As shown in FIG. 8A, the workpiece picking apparatus 200 according to the first modification is configured similarly to the workpiece picking apparatus 100 shown in FIG. 1 except that the sensor 1 is attached to an arm leading edge of the robot 3 (control apparatus 4 is not shown). Thus, the workpiece picking apparatus 200 corresponds to an example of the "object picking apparatus".

Also, the position/orientation recognition result shown in FIG. 8B is, similarly to FIG. 5, an image in which contour lines (line segments corresponding to edges, and line segments shown by thick solid lines in FIG. 8B) that have been detected as feature points or feature parts of the workpieces 56 and 57 in three-dimensional matching are distinguishably displayed in a two-dimensional image that has been obtained by two-dimensionally projecting the positions/orientations of the workpieces 56 and 57 that have been recognized, for example. Note that, in FIG. 8B as well, similarly to FIG. 5, letters F and G indicating the position/orientation recognition results are added to the display regions of the corresponding workpieces 56 and 57. Also, similarity scores S, indices D1 and D2, reliabilities R, and integrated scores ST that have been calculated with respect to the position/orientation recognition results F and G of the workpieces 56 and 57 are listed in the table in FIG. 9.

The positions/orientations of the workpieces 56 and 57 in the position/orientation recognition results F and G shown in FIG. 8B are each an example of a position/orientation at which only one planar face is visible, and as described above, in the case of the position/orientation at which only one planar face is visible, the recognition accuracy in its planar direction (x-y direction) is likely to degrade. This situation may arise when picking of rectangular workpieces 5 progresses, the number of workpieces 5 remaining in the storage container 6 decreases, the remaining workpieces 5 are placed flat on a bottom face of the storage container 6, and this state is measured by the sensor 1 from substantially right above the bottom face of the storage container 6.

With respect to the workpiece 56 shown in FIG. 8B, although the size (area) of a range surrounded by contour lines, which are obtained as the recognition result, is approximately the same as the area of the outer region of the workpiece 56, the position is slightly displaced, and the recognition accuracy in a planar direction (x-y direction) is not good in this regard, and the similarity score is calculated as "80", as shown in FIG. 9. Also, with respect to the workpiece 57, although the size (area) of a range surrounded by contour lines, which are obtained as the recognition result, is substantially different from the area of the outer region of the workpiece 57, and the recognition accuracy in a planar direction (x-y direction) is not good in this regard, because the positions of the contour lines match the outer region or are included in its range, the similarity score is calculated as "100".

In this case, it may be determined that the position/orientation recognition result F of the workpiece 56 is better than the position/orientation recognition result G of the workpiece 57 at a glance of FIG. 8B, but if these qualities are determined based only on the similarity score S, the opposite result is obtained. Moreover, if the threshold value of the similarity score S is set to "90", which is the same as the threshold value of the integrated score ST in the above-described embodiments, for example, there is a risk that the workpiece 57 is determined to be gripped, while the workpiece 56 is determined to be not gripped. However, even if it is tried to grip the workpiece 57 based on the position/orientation recognition result G that is largely different from the actual outer range of the workpiece 57, the possibility of not being able to be gripped may not be high.

In contrast, in the first modification, similarly to the above-described embodiments, the qualities of the position/orientation recognition results F and G of the workpieces 56 and 57 are determined based on the integrated score ST (step S9 in FIG. 4). For example, if the threshold value of the integrated score ST is set to be "90", which is the same as that in the above-described embodiments, the integrated scores ST of both of the position/orientation recognition results F and G are less than the threshold value. Therefore, in the situation shown in FIG. 8B, processing in step S20 onward is performed following the flowchart shown in FIG. 4, and the measurement condition is changed, the measurement data of the workpieces 56 and 57 is again acquired, and then the position/orientation is again recognized.

Figure 10A:
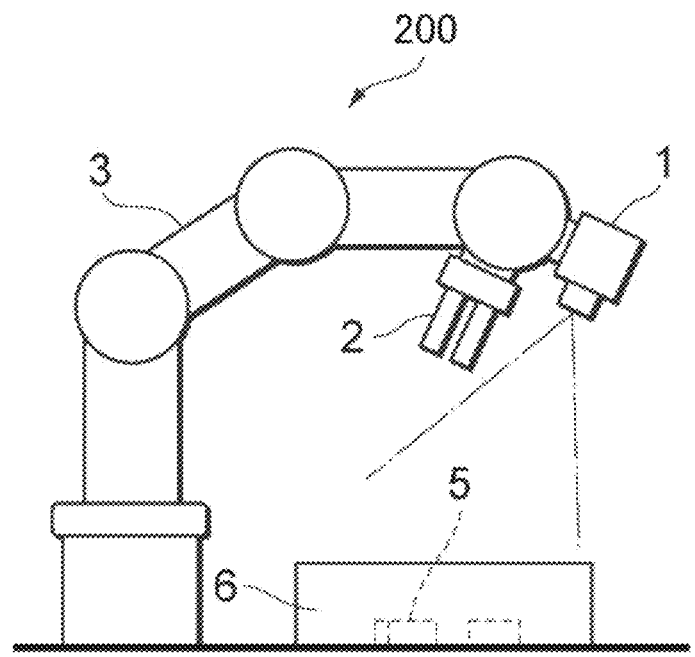
FIG. 10A is a plan diagram schematically illustrating another example of a situation to which an object picking apparatus including an object recognition processing apparatus according to a first modification is applied.
Figure 10B:
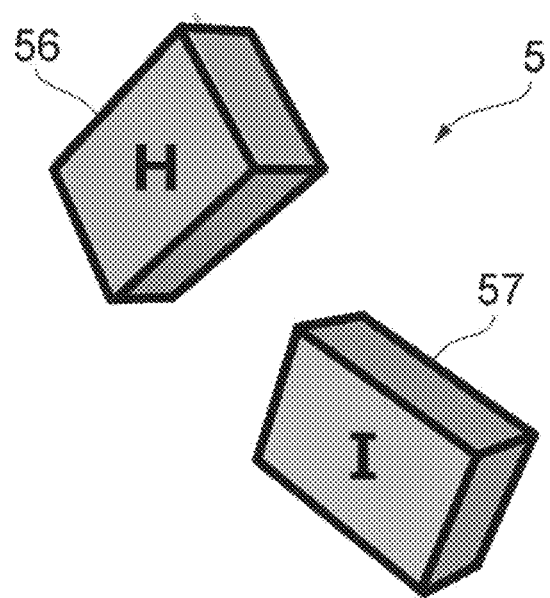
FIG. 10B is a plan diagram schematically illustrating another example of a recognition result of the position/orientation of objects obtained by an object recognition processing apparatus included in an object picking apparatus according to a first modification.

Here, FIG. 10A is a plan view schematically illustrating another example of a situation to which the workpiece picking apparatus 200 including the object recognition processing apparatus according to the first modification is applied, and is a diagram illustrating a state in which the position/orientation of the sensor 1, which is the measurement condition, is changed, and the measurement data of the workpieces 56 and 57 is again acquired. Also, FIG. 10B is a plan view schematically illustrating another example of a recognition result of the position/orientation of the workpieces 56 and 57 obtained by the object recognition processing apparatus included in the workpiece picking apparatus 200 according to the first modification. Note that, in FIG. 10B as well, similarly to FIG. 8B, letters H and I indicating the position/orientation recognition results are added to the display regions of the corresponding workpieces 56 and 57. Also, similarity scores S, indices D1 and D2, reliabilities R, and integrated scores ST that have been calculated with respect to the position/orientation recognition results H and I of the workpieces 56 and 57 are listed in the table in FIG. 11.

As shown in FIG. 10A, the arm of the robot 3 extends forward of the arm relative to the state shown in FIG. 8A, and the angle of the arm leading edge of the robot 3 is changed such that the arm leading edge inclines toward an arm base side, and as a result, the position/orientation (view point) of the sensor 1 attached to the arm leading edge is changed to capture the workpieces 56 and 57 from slightly obliquely above. The re-recognition results H and I of the position/orientation of the workpieces 56 and 57 based on measurement data that has been again acquired by the sensor 1 at this position/orientation are favorable, as shown in FIG. 10B and in the table in FIG. 11. For example, the similarity score S and the integrated score ST have been substantially improved compared with the initial results shown in FIG. 9.

As described above, according to the first modification, similarly to the above-described embodiments, even if the recognition accuracy of the position/orientation of a workpiece 5 that has been once recognized is not good, and the workpiece 5 was not selected to be gripped, the recognition accuracy of the position/orientation can be improved. With this, the number of workpieces 5 that can be reliably gripped can be increased (that is, the grip success rate is improved), and as a result, a favorable and stable picking operation can be realized.

5.2 Second Modification

In the above-described embodiments, at least one of the indices D1 and D2 is used, but in addition to, or in place of them, any of the indices 1, 3, 5, 6, 7, and 8 in the above-described application example may be used.

6. Notes

The embodiments and modifications described above are for the purpose of facilitating understanding of the present invention, and is not to be interpreted as limiting the present invention. Constituent elements of embodiments and modifications and arrangement, materials, conditions, shapes and sizes thereof are not limited to those exemplified, and can be changed as appropriate. In addition, configurations described in different embodiments and modifications can be partially substituted or combined.

Note 1

An object recognition processing apparatus including:

a model data acquisition unit (410) configured to acquire three-dimensional model data indicating a three-dimensional shape of an object (5);

a measurement unit (1) configured to acquire measurement data including three-dimensional position information of the object (5);

a position/orientation recognition unit (420) configured to recognize a position/orientation of the object (5) based on the three-dimensional model data and the measurement data;

a similarity score calculation unit (430) configured to calculate a similarity score (S) indicating a degree of similarity between the three-dimensional model data and the measurement data in a position/orientation recognition result of the object (5);

a reliability calculation unit (440) configured to calculate an index (D1, D2) indicating a feature of a three-dimensional shape of the object (5) in the position/orientation recognition result of the object (5), and calculate a reliability (R) of the similarity score (S) based on the index (D1, D2); and an integrated score calculation unit (450) configured to calculate an integrated score (ST) indicating a quality of the position/orientation recognition result of the object (5) based on the similarity score (S) and the reliability (R).

Note 2

The object recognition processing apparatus according to Note 1, wherein the feature of the three-dimensional shape of the object (5) is a physical amount indicating diversity of the three-dimensional shape of the object (5) that can be grasped from the position/orientation recognition result of the object (5).

Note 3

The object recognition processing apparatus according to Note 1 or 2, wherein the reliability calculation unit (440) is configured to calculate the number of faces in the position/orientation recognition result of the object (5) as the index (D1, D2).

Note 4

The object recognition processing apparatus according to any one of Notes 1 to 3, wherein the reliability calculation unit (440) is configured to quantize normal directions of faces in the position/orientation recognition result of the object (5), and calculate a largest normalized frequency or a dispersion in a frequency distribution of the quantized normal direction as the index (D1, D2).

Note 5

The object recognition processing apparatus according to any one of Notes 1 to 4, wherein the reliability calculation unit (440) is configured to calculate a surface area in the position/orientation recognition result of the object (5) as the index (D1, D2).

Note 6

The object recognition processing apparatus according to any one of Notes 1 to 5, wherein the reliability calculation unit (440) is configured to calculate the number of or a length of contour lines in the position/orientation recognition result of the object (5) as the index (D1, D2).

Note 7

The object recognition processing apparatus according to any one of Notes 1 to 6, wherein the reliability calculation unit (440) is configured to calculate, as the index (D1, D2), the dispersion in a luminance distribution in the position/orientation recognition result of the object (5) or the dispersion in a distance distribution in the position/orientation recognition result of the object (5).

Note 8

The object recognition processing apparatus according to any one of Notes 1 to 7, wherein the reliability calculation unit (440) is configured to apply weighting to the index (D1, D2), and calculate the reliability (R) of the similarity score (S) based on the weighted index (D1, D2).

Note 9

The object recognition processing apparatus according to any one of Notes 1 to 8, wherein the reliability calculation unit (440) is configured to first calculate the index (D1, D2) or the reliability (R) for each of a plurality of different positions/orientations of the object (5), and then select the index (D1, D2) or the reliability (R) corresponding to the position/orientation recognition result of the object (5).

Note 10

An object recognition processing method using an object recognition processing apparatus including a model data acquisition unit (410), a measurement unit (1), a position/orientation recognition unit (420), a similarity score calculation unit (430), a reliability calculation unit (440), and an integrated score calculation unit (450), the method including:

a step of the model data acquisition unit (410) acquiring three-dimensional model data indicating a three-dimensional shape of an object (5);

a step of the measurement unit (1) acquiring measurement data including three-dimensional position information of the object (5);

a step of the position/orientation recognition unit (420) recognizing a position/orientation of the object (5) based on the three-dimensional model data and the measurement data;

a step of the similarity score calculation unit (430) calculating a similarity score (S) indicating a degree of similarity between the three-dimensional model data in a position/orientation recognition result of the object (5) and the measurement data;

a step of the reliability calculation unit (440) calculating an index (D1, D2) indicating a feature of a three-dimensional shape of the object (5) in the position/orientation recognition result of the object (5), and calculating a reliability (R) of the similarity score (S) based on the index (D1, D2); and a step of the integrated score calculation unit (450) calculating an integrated score (ST) indicating a quality of the position/orientation recognition result of the object (5) based on the similarity score (S) and the reliability (R).

Note 11

An object picking apparatus (100, 200) that grips and takes out an object (5), including:

the object recognition processing apparatus according to any one of Notes 1 to 9;

a hand (2) configured to grip the object (5);

a robot (3) configured to move the hand (2); and a control apparatus (4) configured to control the object recognition processing apparatus, the hand (2), and the robot (3), wherein the control apparatus (4) includes:

an object-to-be-gripped determination unit (460) configured to determine the object (5) to be gripped by the hand (2) based on the integrated score (ST) calculated by the object recognition processing apparatus;

a gripping orientation calculation unit (480) configured to calculate a gripping orientation of the hand (2) when gripping the object (5); and a path calculation unit (490) configured to calculate a path on which the robot (3) moves the hand (2) to the gripping orientation.

Note 12

The object picking apparatus (100, 200) according to Note 11, wherein the control apparatus (4) includes a measurement condition change unit (470) configured to change a measurement condition when acquiring the measurement data based on the integrated score (ST) calculated by the object recognition processing apparatus, the measurement unit (1) of the object recognition processing apparatus again acquires measurement data including three-dimensional position information of the object (5) based on the changed measurement condition, and the position/orientation recognition unit (420) of the object recognition processing apparatus again recognizes the position/orientation of the object (5) based on the three-dimensional model data and the re-acquired measurement data.

Note 13

The object picking apparatus (100, 200) according to Note 12, wherein the measurement condition change unit (470) changes the position/orientation of the measurement unit (1) as the measurement condition.

Note 14

The object picking apparatus (100, 200) according to Note 13, wherein the measurement condition change unit (470) calculates a position/orientation of the measurement unit (1) to which the position/orientation of the measurement unit (1) is to be changed based on the three-dimensional model data, a position/orientation recognition result of the object (5) before re-recognition, and a position/orientation of the measurement unit (1) before re-acquisition of the measurement data.

Note 15

An object picking method for gripping and taking out an object (5) using an object picking apparatus (100, 200) including the object recognition processing apparatus according to any one of Notes 1 to 9, a hand (2), a robot (3), and a control apparatus (4), the method comprising:

a calculation step of the object recognition processing apparatus calculating an integrated score (ST) indicating a quality of a position/orientation recognition result of the object (5);

a gripping step of the hand (2) gripping the object (5);

a moving step of the robot (3) moving the hand (2); and a control step of the control apparatus (4) controlling the object recognition processing apparatus, the hand (2), and the robot (3), wherein the control step includes an object-to-be-gripped determination step of determining the object (5) to be gripped by the hand (2) based on the integrated score (ST), a gripping orientation calculation step of calculating a gripping orientation of the hand (2) when gripping the object (5), and a path calculation step of calculating a path on which the hand (2) is moved to the gripping orientation by the robot (3).

INDEX TO THE REFERENCE NUMERALS

1 Sensor
2 Hand
3 Robot
4 Control apparatus
5 Workpiece
6 Storage container
41 Control computation unit
42 Communication interface (I/F) unit
43 Storage unit
44 Input unit
45 Output unit
46 Bus line
51 to 57 Workpiece
51a, 52a, 52b, 53a, 53b, 54a, 54b, 54c, 55a Face
100, 200 Workpiece picking apparatus
410 Model data acquisition unit
420 Position/orientation recognition unit
430 Similarity score calculation unit
440 Reliability calculation unit
450 Integrated score calculation unit
460 Object to be gripped determination unit
470 Measurement condition change unit
480 Gripping orientation calculation unit
490 Path calculation unit
510 Sensor control unit
520 Hand control unit
530 Robot control unit

The invention claimed is:

1. An object recognition processing apparatus comprising: a processor configured with a program to perform operations comprising:
   operation as a model data acquisition unit configured to acquire three-dimensional model data indicating a three-dimensional shape of an object;
   operation as a measurement unit configured to acquire measurement data comprising three-dimensional position information of the object;
   operation as a position/orientation recognition unit configured to recognize a position/orientation of the object based on the three-dimensional model data and the measurement data;
   operation as a similarity score calculation unit configured to calculate a similarity score indicating a degree of similarity between the three-dimensional model data and the measurement data in a position/orientation recognition result of the object;
   operation as a reliability calculation unit configured to calculate an index indicating a feature of a three-dimensional shape of the object in the position/orientation recognition result of the object, and calculate a reliability of the similarity score based on the index; and
   operation as an integrated score calculation unit configured to calculate an integrated score indicating a quality of the position/orientation recognition result of the object based on the similarity score and the reliability.

2. The object recognition processing apparatus according to claim 1, wherein the feature of the three-dimensional shape of the object comprises a physical amount indicating diversity of the three-dimensional shape of the object that can be grasped from the position/orientation recognition result of the object.

3. The object recognition processing apparatus according to claim 2, wherein the processor is configured with the program perform operations such that operation as the reliability calculation unit is further configured to calculate, as the index, the number of faces in the position/orientation recognition result of the object.

4. The object recognition processing apparatus according to claim 2, wherein the processor is configured with the program perform operations such that operation as the reliability calculation unit is further configured to quantize normal directions of faces in the position/orientation recognition result of the object, and calculate, as the index, a largest normalized frequency or dispersion in a frequency distribution of the quantized normal direction.

5. The object recognition processing apparatus according to claim 2, wherein the processor is configured with the program perform operations such that operation as the reliability calculation unit is further configured to calculate, as the index, a surface area in the position/orientation recognition result of the object.

6. The object recognition processing apparatus according to claim 2, wherein the processor is configured with the program perform operations such that operation as the reliability calculation unit is further configured to calculate, as the index, the number of or a length of contour lines in the position/orientation recognition result of the object.

7. The object recognition processing apparatus according to claim 2, wherein the processor is configured with the program perform operations such that operation as the reliability calculation unit is further configured to calculate, as the index, dispersion in a luminance distribution in the position/orientation recognition result of the object or dispersion in a distance distribution in the position/orientation recognition result of the object.

8. The object recognition processing apparatus according to claim 1, wherein the processor is configured with the program perform operations such that operation as the reliability calculation unit is further configured to calculate, as the index, the number of faces in the position/orientation recognition result of the object.

9. The object recognition processing apparatus according to claim 1, wherein the processor is configured with the program perform operations such that operation as the reliability calculation unit is further configured to quantize normal directions of faces in the position/orientation recognition result of the object, and calculate, as the index, a largest normalized frequency or dispersion in a frequency distribution of the quantized normal direction.

10. The object recognition processing apparatus according to claim 1, wherein the processor is configured with the program perform operations such that operation as the reliability calculation unit is further configured to calculate, as the index, a surface area in the position/orientation recognition result of the object.

11. The object recognition processing apparatus according to claim 1, wherein the processor is configured with the program perform operations such that operation as the reliability calculation unit is further configured to calculate, as the index, the number of or a length of contour lines in the position/orientation recognition result of the object.

12. The object recognition processing apparatus according to claim 1, wherein the processor is configured with the program perform operations such that operation as the reliability calculation unit is further configured to calculate, as the index, dispersion in a luminance distribution in the position/orientation recognition result of the object or dispersion in a distance distribution in the position/orientation recognition result of the object.

13. The object recognition processing apparatus according to claim 1, wherein the processor is configured with the program perform operations such that operation as the reliability calculation unit is further configured to apply weighting to the index, and calculate the reliability of the similarity score based on the weighted index.

14. The object recognition processing apparatus according to claim 1, wherein the processor is configured with the program perform operations such that operation as the reliability calculation unit is further configured to calculate the index or the reliability for each of a plurality of different positions/orientations of the object, and then select the index or the reliability corresponding to the position/orientation recognition result of the object.

15. An object picking method for gripping and taking out an object using an object picking apparatus comprising the object recognition processing apparatus according to claim 1, a hand, a robot, and a control apparatus, the method comprising:
  calculating, by the object recognition processing apparatus, an integrated score indicating a quality of a position/orientation recognition result of the object;
  gripping the object by the hand;
  moving the hand by the robot; and
  controlling, by the control apparatus, the object recognition processing apparatus, the hand, and the robot, wherein
  the controlling comprises determining the object to be gripped by the hand based on the integrated score, calculating a gripping orientation of the hand in response to gripping the object, and calculating a path on which the hand is moved to the gripping orientation by the robot.

16. An object picking apparatus that grips and takes out an object, comprising:
  the object recognition processing apparatus according to claim 1;
  a hand configured to grip the object;
  a robot configured to move the hand; and
  a control apparatus configured to control the object recognition processing apparatus, the hand, and the robot, wherein
  the control apparatus comprises a processor configured with a program to perform operations comprising:
    operation as an object-to-be-gripped determination unit configured to determine the object to be gripped by the hand based on the integrated score calculated by the object recognition processing apparatus;
    operation as a gripping orientation calculation unit configured to calculate a gripping orientation of the hand in response to gripping the object; and
    operation as a path calculation unit configured to calculate a path on which the robot moves the hand to the gripping orientation.

17. The object picking apparatus according to claim 16, wherein
  the processor of the control apparatus is configured with the program perform operations such that:
    operation as a measurement condition change unit is configured to change a measurement condition in response to acquiring the measurement data based on the integrated score calculated by the object recognition processing apparatus,
  the processor of the object recognition processing apparatus is configured with the program perform operations such that:
    operation as the measurement unit of the object recognition processing apparatus is further configured to acquire again measurement data comprising three-dimensional position information of the object based on the changed measurement condition; and
    operation as the position/orientation recognition unit of the object recognition processing apparatus is further configured to recognize again the position/orientation of the object based on the three-dimensional model data and the re-acquired measurement data.

18. The object picking apparatus according to claim 17, wherein the processor of the control apparatus is configured with the program perform operations such that operation as the measurement condition change unit is further configured to change the position/orientation of the measurement unit as the measurement condition.

19. The object picking apparatus according to claim 18, wherein the processor of the control apparatus is configured with the program perform operations such that operation as the measurement condition change unit is further configured to calculate a position/orientation of the measurement unit to which the position/orientation of the measurement unit is to be changed based on the three-dimensional model data, a position/orientation recognition result of the object before re-recognition, and a position/orientation of the measurement unit before re-acquisition of the measurement data.

20. An object recognition processing method using an object recognition processing apparatus comprising a model data acquisition unit, a measurement unit, a position/orientation recognition unit, a similarity score calculation unit, a reliability calculation unit, and an integrated score calculation unit, the method comprising:
  acquiring, by the model data acquisition unit, three-dimensional model data indicating a three-dimensional shape of an object;
  acquiring, by the measurement unit, measurement data comprising three-dimensional position information of the object;
  recognizing, by the position/orientation recognition unit, a position/orientation of the object based on the three-dimensional model data and the measurement data;
  calculating, by the similarity score calculation unit, a similarity score indicating a degree of similarity between the three-dimensional model data in a position/orientation recognition result of the object and the measurement data;
  calculating, by the reliability calculation unit, an index indicating a feature of a three-dimensional shape of the object in the position/orientation recognition result of the object, and calculating a reliability of the similarity score based on the index; and
  calculating, by the integrated score calculation unit, an integrated score indicating a quality of the position/orientation recognition result of the object based on the similarity score and the reliability.

* * * * *